US011254332B2

(12) United States Patent
Narang et al.

(10) Patent No.: US 11,254,332 B2
(45) Date of Patent: *Feb. 22, 2022

(54) METHOD AND SYSTEM FOR CONTEXT-AWARE DECISION MAKING OF AN AUTONOMOUS AGENT

(71) Applicant: Gatik AI Inc., Palo Alto, CA (US)

(72) Inventors: Gautam Narang, Palo Alto, CA (US); Apeksha Kumavat, Palo Alto, CA (US); Arjun Narang, Palo Alto, CA (US); Kinh Tieu, Palo Alto, CA (US); Michael Smart, Palo Alto, CA (US); Marko Ilievski, Palo Alto, CA (US)

(73) Assignee: Gatik AI Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,748

(22) Filed: May 27, 2021

(65) Prior Publication Data

US 2021/0380129 A1 Dec. 9, 2021

Related U.S. Application Data

(63) Continuation of application No. 17/306,014, filed on May 3, 2021, which is a continuation of application
(Continued)

(51) Int. Cl.
*B60W 60/00* (2020.01)
*G01C 21/36* (2006.01)
(Continued)

(52) U.S. Cl.
CPC ....... *B60W 60/001* (2020.02); *G01C 21/3461* (2013.01); *G01C 21/3673* (2013.01);
(Continued)

(58) Field of Classification Search
CPC ............. B60W 60/001; G01C 21/3461; G01C 21/3673; G06K 9/6259; H04W 4/021
See application file for complete search history.

(56) References Cited

U.S. PATENT DOCUMENTS 6,278,965 B1 8/2001 Glass et al.
6,292,830 B1 9/2001 Taylor et al.
(Continued)

OTHER PUBLICATIONS

International Search Report and Written Opinion for application No. PCT/US20/64058 dated Feb. 26, 2021.
(Continued)

*Primary Examiner* — Tan Q Nguyen
(74) *Attorney, Agent, or Firm* — Jefrey Schox; Caitlin Ploch

(57) ABSTRACT

A system for context-aware decision making of an autonomous agent includes a computing system having a context selector and a map. A method for context-aware decision making of an autonomous agent includes receiving a set of inputs, determining a context associated with an autonomous agent based on the set of inputs, and optionally any or all of: labeling a map; selecting a learning module (context-specific learning module) based on the context; defining an action space based on the learning module; selecting an action from the action space; planning a trajectory based on the action S260; and/or any other suitable processes.

20 Claims, 14 Drawing Sheets

Related U.S. Application Data

No. 17/116,810, filed on Dec. 9, 2020, now Pat. No. 11,034,364.

(60) Provisional application No. 63/055,756, filed on Jul. 23, 2020, provisional application No. 63/035,401, filed on Jun. 5, 2020.

(51) Int. Cl.
  *G01C 21/34* (2006.01)
  *G06K 9/62* (2022.01)
  *H04W 4/021* (2018.01)
  *G06N 20/00* (2019.01)

(52) U.S. Cl.
  CPC ........... *G06K 9/6259* (2013.01); *G06N 20/00* (2019.01); *H04W 4/021* (2013.01)

(56) References Cited

U.S. PATENT DOCUMENTS

| | | | |
|---|---|---|---|
| 8,737,986 B2* | 5/2014 | Rhoads | G06F 3/016 |
| | | | 455/426.1 |
| 9,507,346 B1 | 11/2016 | Levinson et al. | |
| 10,106,153 B1 | 10/2018 | Xiao et al. | |
| 10,860,022 B2 | 12/2020 | Korchev et al. | |
| 2008/0312833 A1 | 12/2008 | Greene et al. | |
| 2010/0131148 A1 | 5/2010 | Camhi et al. | |
| 2015/0100530 A1 | 4/2015 | Mnih et al. | |
| 2018/0196439 A1 | 7/2018 | Levinson et al. | |
| 2018/0232585 A1 | 8/2018 | Kim | |
| 2018/0339709 A1 | 11/2018 | Tiwari et al. | |
| 2019/0033085 A1 | 1/2019 | Ogale et al. | |
| 2019/0084571 A1 | 3/2019 | Zhu et al. | |
| 2019/0145784 A1 | 5/2019 | Ma et al. | |
| 2019/0146508 A1 | 5/2019 | Dean et al. | |
| 2019/0147255 A1* | 5/2019 | Homayounfar | G06N 3/0454 |
| | | | 701/23 |
| 2019/0315351 A1 | 10/2019 | Smith et al. | |
| 2019/0317496 A1 | 10/2019 | Korchev et al. | |
| 2019/0329763 A1 | 10/2019 | Sierra Gonzalez et al. | |
| 2019/0378019 A1 | 12/2019 | Scheutz et al. | |
| 2020/0033855 A1 | 1/2020 | Jammalamadaka et al. | |
| 2020/0033868 A1 | 1/2020 | Palanisamy et al. | |
| 2020/0086862 A1 | 3/2020 | Cui et al. | |
| 2020/0150672 A1 | 5/2020 | Naghshvar et al. | |
| 2020/0174472 A1 | 6/2020 | Zhang et al. | |
| 2020/0207339 A1 | 7/2020 | Neil et al. | |
| 2020/0302322 A1 | 9/2020 | Tukiainen et al. | |
| 2020/0356828 A1* | 11/2020 | Palanisamy | G05D 1/0246 |

OTHER PUBLICATIONS

International Search Report and Written Opinion for application No. PCT/US2020/065700 dated Mar. 24, 2021.

International Search Report and Written Opinion for application No. PCT/US2020/66181 dated Mar. 17, 2021.

"ApolloAuto/apollo Planning", GitHub, https://github.com/ApolloAuto/apollo/blob/master/modules/planning/README.md.

"Learning to Drive in a Day", https://www.youtube.com/watch?v=eRwTbRtnT1l, Jul. 2, 2018.

"Learning to Drive in a Day", Wayve, in research, Jun. 28, 2018, https://wayve.ai/blog/learning-to-drive-in-a-day-with-reinforcement-learning/.

Dabboussi, Abdallah, "Dependability approaches for mobile environment: Application on connected autonomous vehicles", Diss. University Bourgogne Franche-Comté, 2019, submitted Mar. 12, 2020.

Kendall, Alex, et al., "Learning to Drive in a Day", arXiv:1807.00412v2,11. Sep. 2011.

Loquercio, Antonio, et al., "A General Framework for Uncertainty Estimation in Deep Learning", IEEE Robotics and Automation Letters PP(99):1-1, Feb. 2020.

Rastgoftar, Hossein, et al., "A Data-Driven Approach for Autonomous Motion Planning and Control in Off-Road Driving Scenarios", 2018 American Control Conference (ACC), IEEE, 2018, May 2018.

Schwarting, Wilko, et al., "Planning and Decision-Making for Autonomous Vehicles", Annual Review of Control, Robotics, and Autonomous Systems, Jan. 12, 2018, pp. 187-210.

\* cited by examiner

Variation of a route with all and/or almost all right turns between two customers locations First context: single lane parking lot Second context: single lane residential road Third context: multi-lane residential road Route 1 (a to b)

C1: two-way, two-lane residential road
C2: one-way, two-lane residential road
C3: one-way, one-lane service road Route 2 (a' to b')

C1': two-way, two-lane residential road
C2': three-lane roundabout
C3': two-way, six-lane highway
C4': two-way, four-lane commercial road
C5': parking garage entrance side Map C1: two-way, two-lane residential road
C2: two-way, two-lane commercial road
C3: two-way, six-lane highway
C4: two-way, two-lane commercial road
C5: two-lane roundabout
C6: single entrance/exit parking lot
C7: separate entrance/exit parking garage
C8: 4-way stop Transition zone
Context region boundary

METHOD AND SYSTEM FOR CONTEXT-AWARE DECISION MAKING OF AN AUTONOMOUS AGENT

CROSS-REFERENCE TO RELATED APPLICATIONS

This application is a continuation of U.S. application Ser. No. 17/306,014, filed 3 May 2021, which is a continuation of U.S. application Ser. No. 17/116,810, filed 9 Dec. 2020, which claims the benefit of U.S. Provisional Application Ser. No. 63/035,401, filed 5 Jun. 2020, and U.S. Provisional Application Ser. No. 63/055,756, filed 23 Jul. 2020, each of which is incorporated in its entirety by this reference.

TECHNICAL FIELD

This invention relates generally to the autonomous vehicle field, and more specifically to a new and useful system and method for context-aware decision making of an autonomous agent in the autonomous vehicle field.

BACKGROUND

In autonomous and semi-autonomous control of automotive vehicles, conventional systems and methods for decision making can be classified as one of two approaches: classical approaches relying on traditional programming principles and machine learning based approaches. However, each of these approaches comes with its limitations. Further, a large percentage of current autonomous vehicle systems and methods attempt to drive in various different environments, which makes either the classical approaches extremely involved (and most likely impossible) or the machine learning based approaches lacking explainability (and therefore causing safety concerns).

Thus, there is a need in the autonomous vehicle field to create an improved and useful system and method for decision making.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
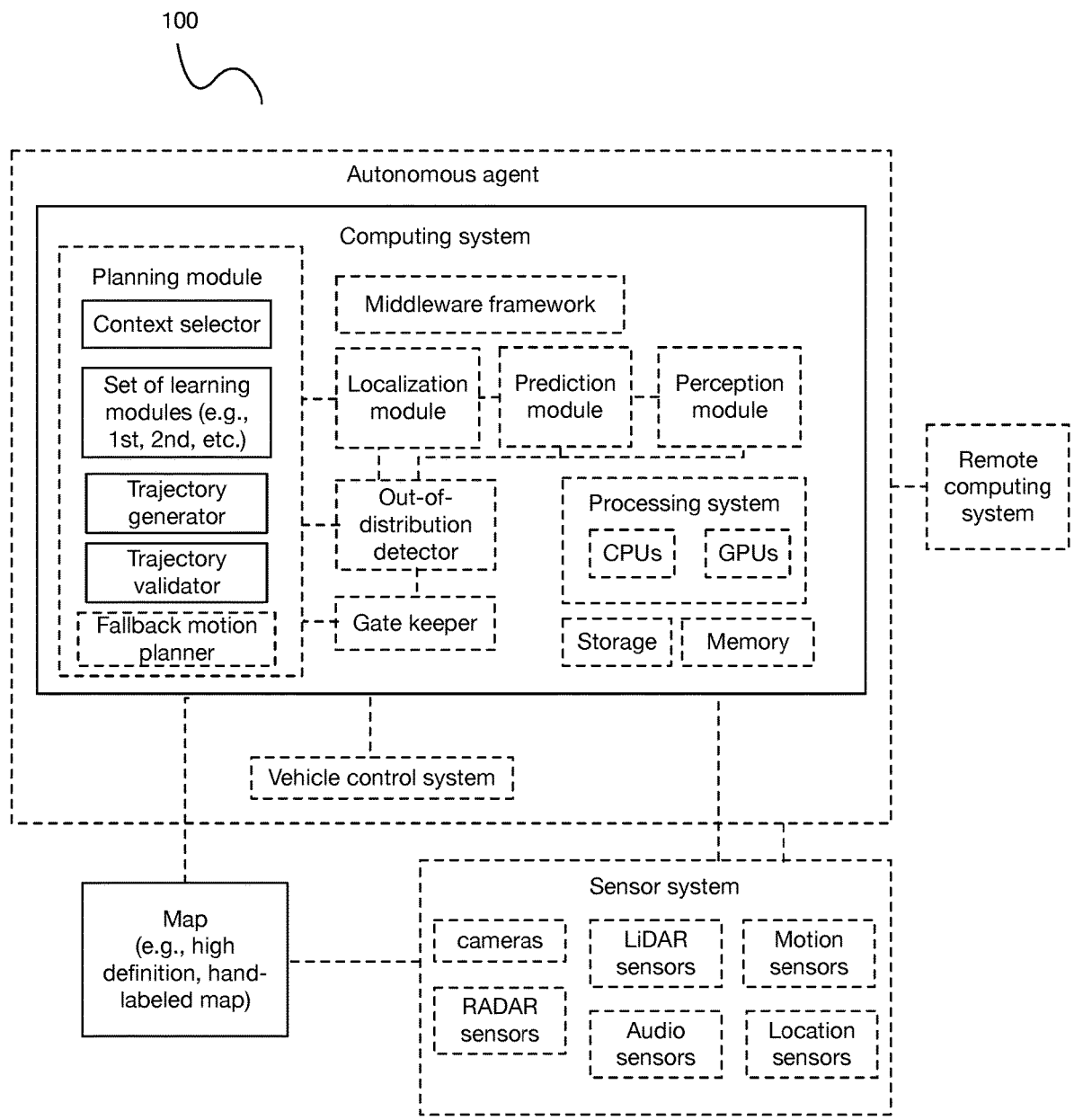
FIG. 1 is a schematic of an autonomous vehicle system for context selection.

As shown in FIG. 1, a system 100 for context-aware decision making of an autonomous agent includes a computing system having a context selector and a map. Additionally or alternatively, the system can include and/or interface with any or all of: an autonomous agent (equivalently referred to herein as an autonomous vehicle and/or an ego vehicle); a vehicle control system; a sensor system; and/or any other suitable components or combination of components.

Figure 2:
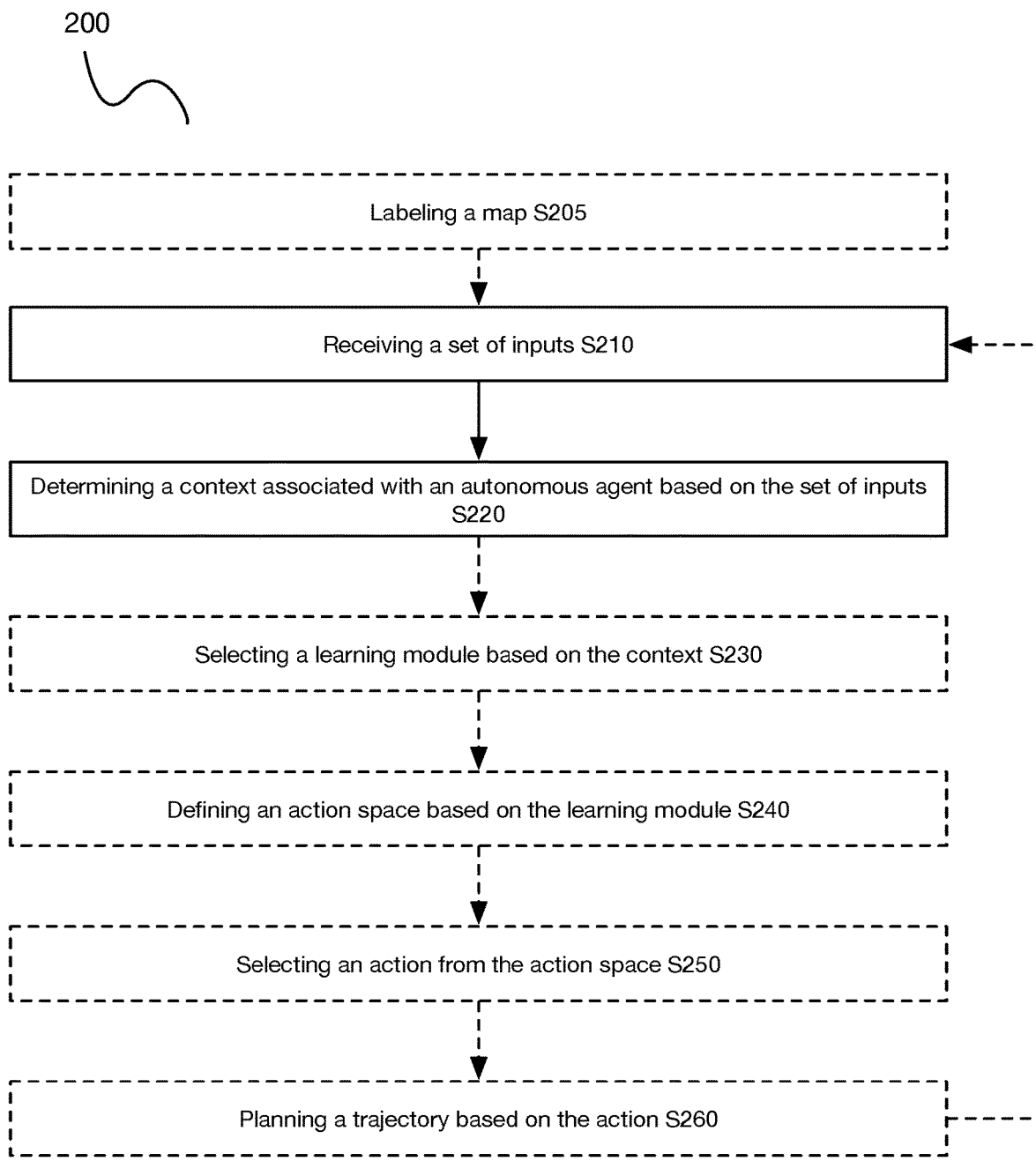
FIG. 2 is a schematic of a method for autonomous vehicle context selection.

As shown in FIG. 2, a method 200 for context-aware decision making of an autonomous agent includes receiving a set of inputs S210 and determining a context associated with an autonomous agent based on the set of inputs S220. Additionally or alternatively, the method 200 can include any or all of: labeling a map S205; selecting a learning module (context-specific learning module) based on the context S230; defining an action space based on the learning module S240; selecting an action from the action space S250; planning a trajectory based on the action S26o; and/or any other suitable processes. The method 200 can be performed with a system as described above and/or any other suitable system.

2. Benefits

The system and method for context-aware decision making of an autonomous agent can confer several benefits over current systems and methods.

First, in preferred variations, the system and/or method confers the benefit of decision making through a hybrid approach of deep learning and rule-based processes, achieving explainable artificial intelligence (AI).

This can in turn confer the benefit of achieving a safe and scalable solution for autonomy by any or all of: decomposing learned models into micro-modules with intended functionality restricted to very explainable tasks; building rule-based fallback and validation systems around the micro-modules to guarantee safety, which enables validation of the performance and underlying properties of each of these sub-modules; and/or any other suitable processes.

Second, in preferred variations, the system and/or method further confers the benefit of reducing the amount of data required to traverse, validate, and/or add a new route by implementing a small, limited-route ODD including a small number of contexts which can be overly defined and/or described, thereby eliminating and/or reducing a number of edge cases encountered by the vehicle. Equivalently, the system and/or method can reduce the need for a large amount of data due to acute confinement of problem while maintaining all the benefits of learning systems (e.g., maintaining an extremely low margin of error in decisions, enabling human-style driving decisions, continued driving progress, etc.). This can enable an optimal selection of learning modules (e.g., deep learning models) and/or training of the learning modules based on low required data and or minimal edge cases; in some examples, for instance, inverse reinforcement learning algorithms (which conventionally require diverse and significant amounts of data to be trained) can be leveraged, which effectively replicate human driving. In specific examples, significantly less data (e.g., 50 times less, 100 times less, 1000 times less, etc.) is required than geofenced approaches to validate a route.

Figure 10A:
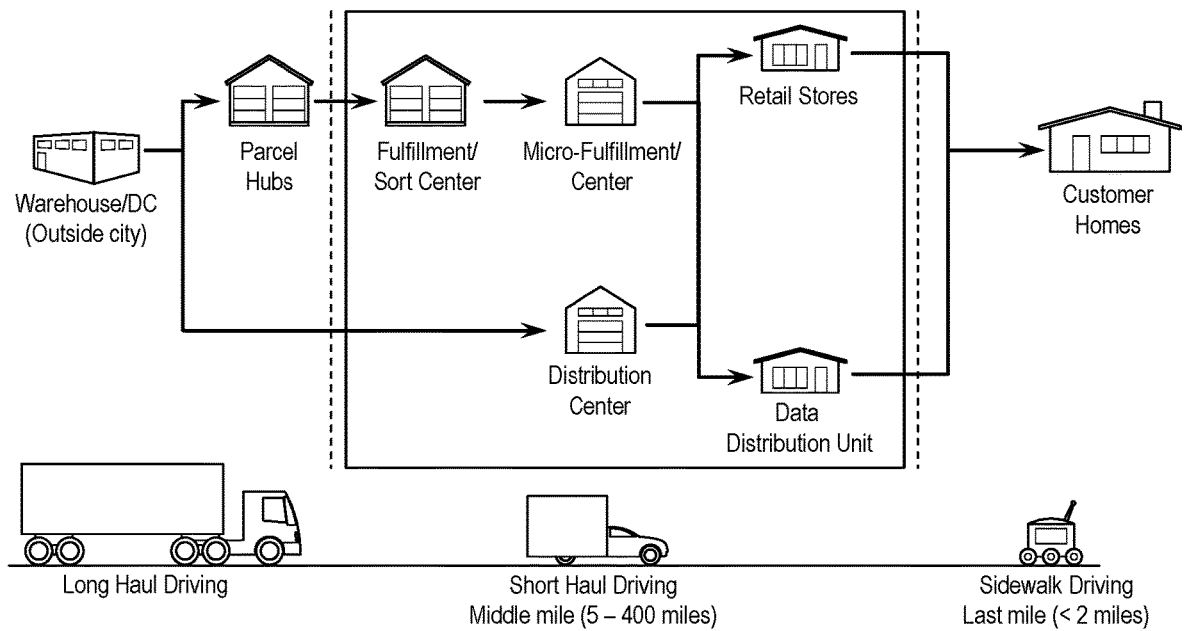
FIGS. 10A-10B depict a variation of a use case of an autonomous vehicle in fixed-route deliveries and a schematic of fixed routes driven by the vehicles.
Figure 10B:
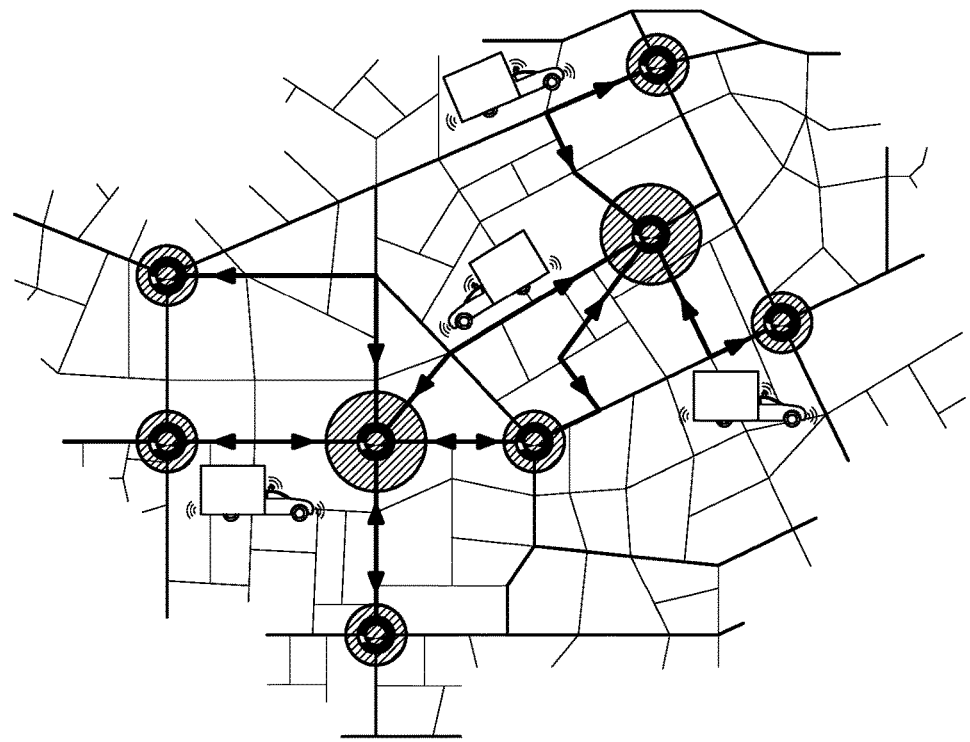

Third, in some variations (e.g., as shown in FIGS. 10A-10B), the system and/or method confers the benefit of enabling supply chain growth in short haul logistics (e.g., B2B trucking) applications, by enabling fixed route autonomous delivery of goods between locations.

Fourth, in preferred variations, the system and/or method further preferably confer the benefit of enabling determination and awareness of a context of an autonomous vehicle, which can confer the subsequent benefits of: achieving smooth switching of contexts (e.g., with minimal validation and testing, based on a predetermined series of contexts specified for particular fixed route, etc.); training models based on a specific context (therefore reducing the training required for each model), such as optimizing for different cost functions and/or parameters in different contexts; selecting safe and appropriate behaviors/actions for the vehicle in light of the context; and/or can confer any other benefit.

Fifth, in some variations, the system and/or method confers the benefit of overcoming the shortcomings of conventional systems and methods, which can include, for instance, any or all of: an inability to adapt to unexpected situations; overgeneralization, which often leads to conservative behavior; hard-to-tune (e.g., hard to manually tune) parameters; constraint monitoring and adaptation of hyper parameters based on environmental changes; unsolvability even in small ODDs; and/or any other shortcomings of conventional systems and methods.

Additionally or alternatively, the system and method can confer any other benefit.

3. System 100

The system 100 functions to enable context selection and context-aware decision making for a vehicle and includes: a computing system having a context selector and a map. Additionally or alternatively, the system can include and/or interface with any or all of: an autonomous agent; a vehicle control system; a sensor system; and/or any other suitable components or combination of components.

Figure 3:
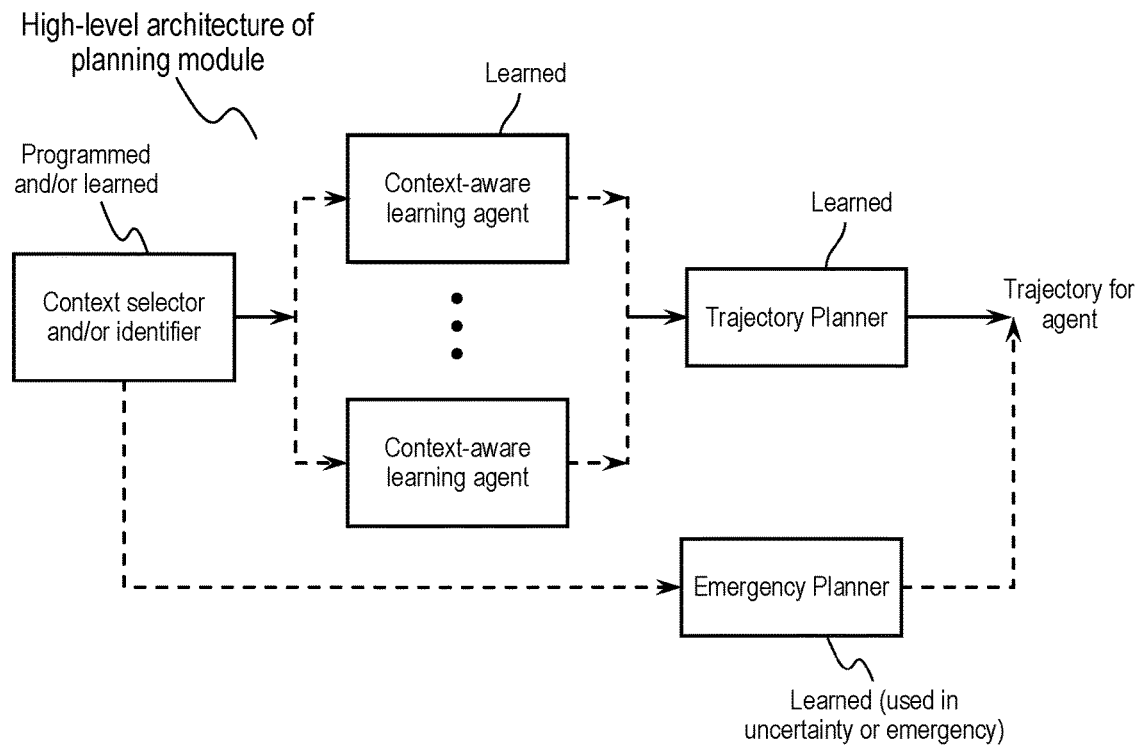
FIG. 3 depicts a variation of an integration of the system for context selection (context selector) within an autonomous vehicle architecture.
Figure 8:
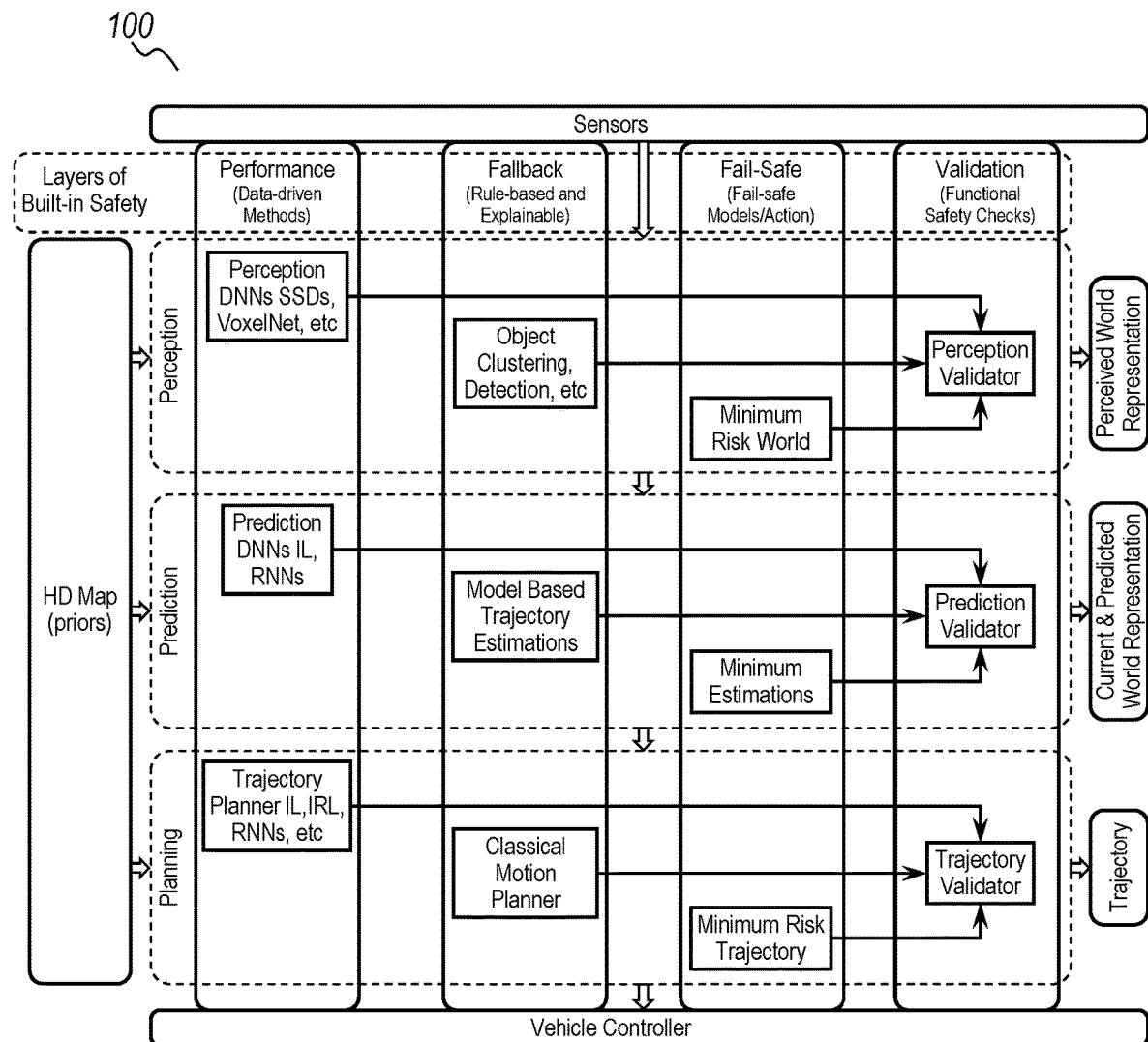
FIG. 8 depicts a schematic variation of an overall system of the autonomous agent.
Figure 9:
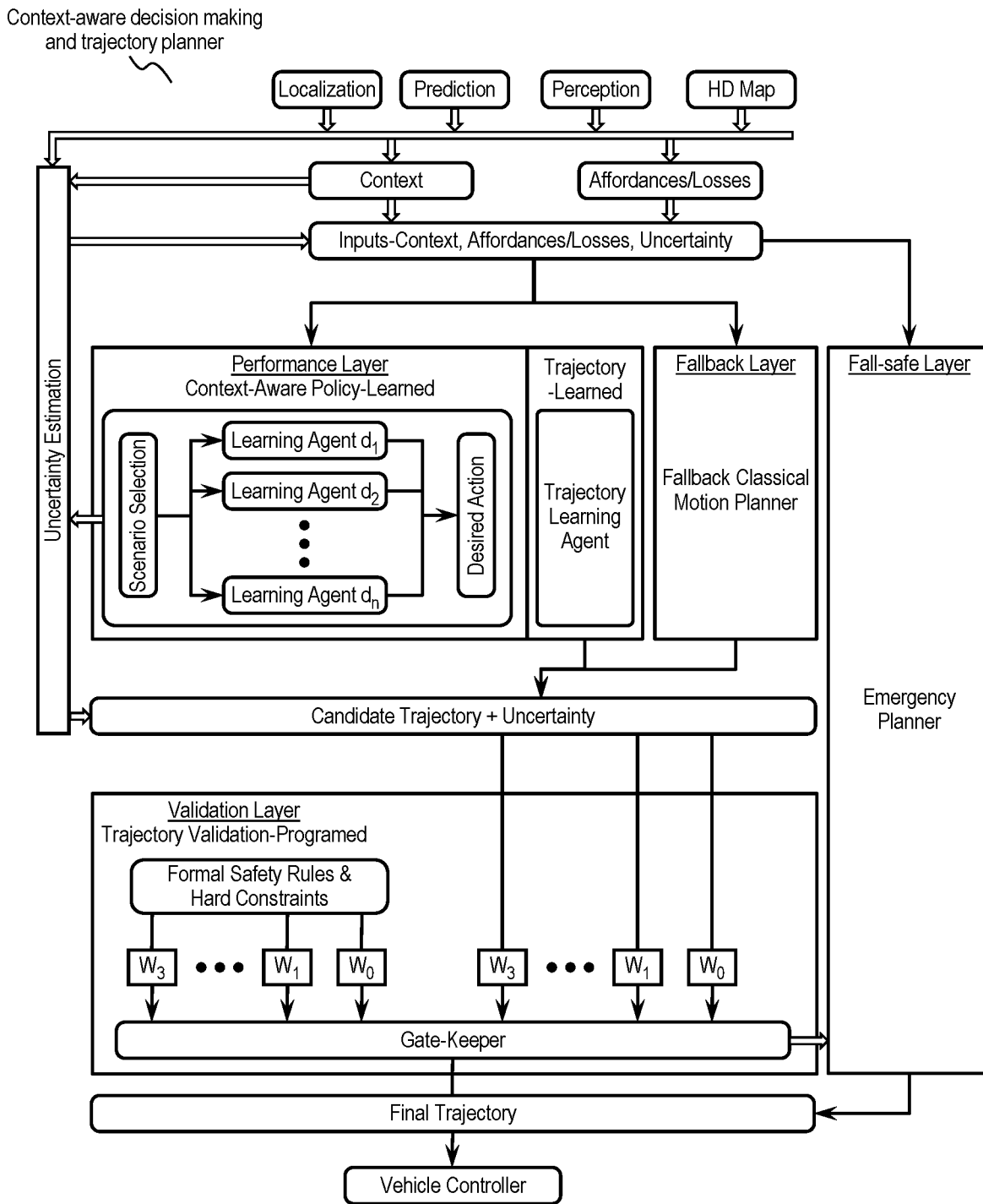
FIG. 9 depicts a schematic variation of context-aware decision making and trajectory planning.
Figure 11:
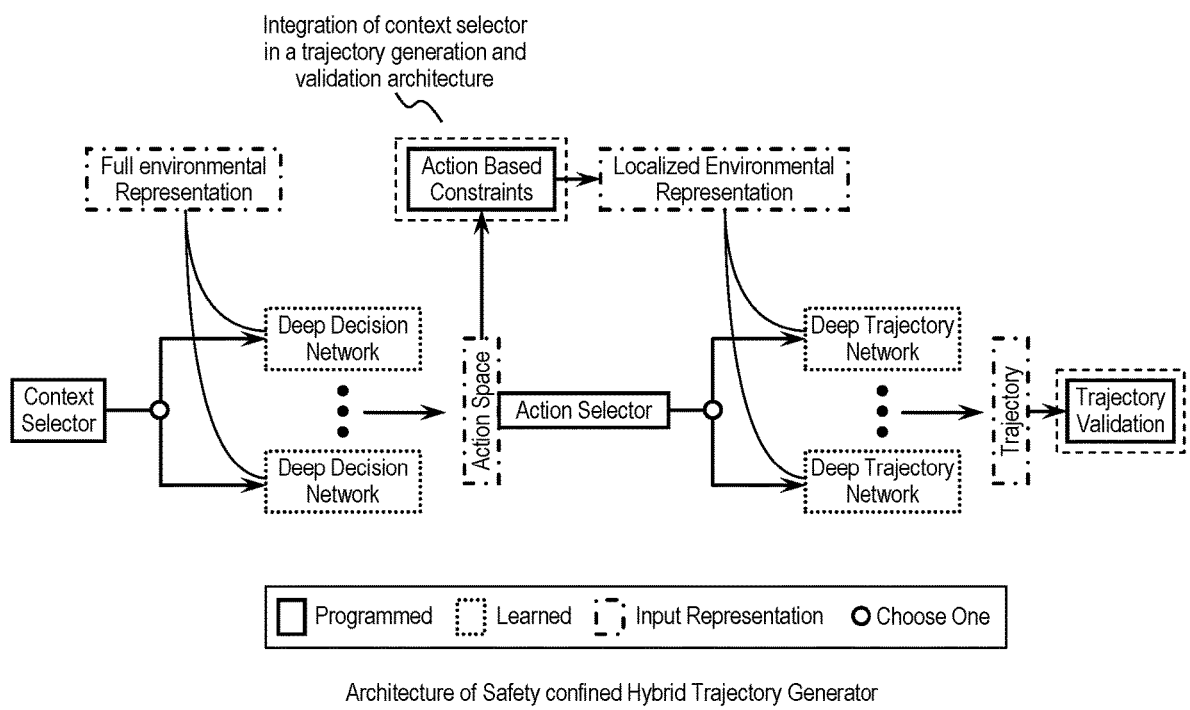
FIG. 11 depicts a variation of an integration of a context selector in a trajectory generation architecture.

The system 100 is preferably configured to implement and/or interface with a system which implements a hybrid architecture of decision making (e.g., as shown in FIG. 3, as shown in FIG. 8, as shown in FIG. 9, as shown in FIG. 11, etc.), the hybrid architecture implementing both classical, rule-based approaches and machine learning approaches, which is enabled by a small ODD, fixed route driving framework. This functions to maintain explainability of the vehicle's decision making while enabling the vehicle to drive with human-like driving behavior on routes validated with minimal training data.

In a first set of variations, as shown in FIGS. 10-10B, the system 100 is implemented in autonomous short-haul (e.g., between 5 and 400 miles) B2B fixed-route applications. In these variations, the autonomous agents preferably receive inventory from sorting centers, but can additionally or alternatively receive inventory for parcel hubs and/or warehouses. The agent then preferably delivers the inventory to and/or between any or all of: sorting centers, micro-fulfillment centers, distribution centers, retail stores, and local delivery centers. Additionally or alternatively, the agents can interface with residences (e.g., customer homes), and/or any other suitable locations/facilities.

3.1 System—Components

The system 100 includes a computing system, which functions to select a context associated with the vehicle. Additionally or alternatively, the computing system can function to perform any or all of: route planning of the vehicle at a planning module (e.g., generating a trajectory); localization of the vehicle and/or surrounding objects at a localization module; path prediction of the vehicle and/or objects surrounding the vehicle at a prediction module; storage of information; and/or any other suitable functions.

The computing system is preferably designed to offer a centralized and parallel computing model which enables high concurrency of task execution, low latency, and high throughput. The adaptive communication capabilities of the framework allows for high data throughput while the user-level scheduler with resource awareness enables the centralized computing model to perform at the highest level.

To enable this, the computing system is preferably designed at least partially in a modular format including a set of modular computing components, referred to herein as learning modules (equivalently referred to herein as learning agents or learning models), each associated with predefined inputs and outputs. Each computing component contains a specific algorithm module built to process a set of data inputs and generate a set of outputs. The computing system can optionally include a middleware framework, which extracts dependencies from these components and links them all together (e.g., with a topological ordering process such as a directed acyclic graph, etc.). At runtime, for instance, the framework takes the predefined components described above and combines them with fused data from the sensors to create lightweight user-level tasks. Each task is then scheduled based on resource availability and task priorities and executed as optimized threads.

Additionally or alternatively, the system and/or computing system can be otherwise configured and/or designed.

The computing system includes an onboard computing system onboard (e.g., integrated within) the autonomous agent.

In preferred variations, the autonomous agent includes an autonomous vehicle that is preferably a fully autonomous vehicle and/or able to be operated as a fully autonomous vehicle, but can additionally or alternatively be any semi-autonomous or fully autonomous vehicle, a teleoperated vehicle, and/or any other suitable vehicle. The autonomous vehicle is preferably an automobile (e.g., car, driverless car, bus, shuttle, taxi, ride-share vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The computing system can additionally or alternatively include a remote computing system offboard the autonomous agent, such as a cloud computing system. The remote computing system is preferably in communication with the onboard computing system (e.g., to collect information from the onboard computing system, to provide updated models to the onboard computing system, etc.), but can additionally or alternatively be in communication with any other suitable components.

The computing system preferably includes active and redundant subsystems, but can additionally or alternatively include any other suitable subsystems.

The computing system preferably includes a context selector, which functions to select a context associated with the vehicle. The context selector is further preferably part of a planning module of the computing system, which can additionally include any or all of: a set of learning modules (e.g., deep learning models); a trajectory generator; a trajectory validator; and/or any other suitable components. Additionally or alternatively, the context selector can be independent from a planning module, a planning module can include any other suitable components, and/or the computing system can be otherwise configured.

The computing system further preferably includes a processing system, which functions to process the inputs received at the computing system. The processing system preferably includes a set of central processing units (CPUs) and a set of graphical processing units (GPUs), but can additionally or alternatively include any other components or combination of components (e.g., processors, microprocessors, system-on-a-chip (SoC) components, etc.).

The computing system can optionally further include any or all of: memory, storage, and/or any other suitable components.

In addition to the planning module, the computing system can include and/or interface with any or all of: a localization module, prediction module, perception module, and/or any other suitable modules for operation of the autonomous agent.

The computing system (e.g., onboard computing system) is preferably in communication with (e.g., in wireless communication with, in wired communication with, coupled to, physically coupled to, electrically coupled to, etc.) a vehicle control system, which functions to execute commands determined by the computing system.

The computing system includes and/or interfaces with a map, which functions to at least partially enable the determination of a context associated with the autonomous agent. The map is preferably a high definition, hand-labeled map as described below, which prescribes the context of the autonomous agent based on its location and/or position within the map, but can additionally or alternatively include any other map (e.g., map labeled in an automated fashion, map labeled through both manual and automated processes, etc.) and/or combination of maps.

The system 100 preferably includes and/or interfaces with a sensor system (equivalently referred to herein as a sensor subsystem), which functions to enable any or all of: a localization of the autonomous agent (e.g., within a map), a detection of surrounding objects (e.g., dynamic objects, static objects, etc.) of the autonomous agent, and/or any other suitable function.

The sensor system can include any or all of: cameras (e.g., 360-degree coverage cameras, ultra-high resolution cameras, etc.), light detection and ranging (LiDAR) sensors, radio detection and ranging (RADAR) sensors, motion sensors (e.g., accelerometers, gyroscopes, inertial measurement units [IMUs], speedometers, etc.), location sensors (e.g., Global Navigation Satellite System [GNSS] sensors, Inertial Navigation System [INS] sensors, Global Positioning System [GPS] sensors, any combination, etc.), ultrasonic sensors, and/or any suitable sensors.

In a set of variations, the sensor system includes: 16-beam LIDARs (e.g., for high fidelity obstacle detection, etc.); short range RADARs (e.g., for blind spot detection, cross traffic alert, emergency braking, etc.); ultrasonic sensors (e.g., for park assist, collision avoidance, etc.); 360-degree coverage cameras (e.g., for surround view for pedestrian/cyclist/urban obstacle detection and avoidance, etc.); 128-beam LIDAR (e.g., for localization of vehicle with high precision); long range ultra-high resolution cameras (e.g., for traffic sign and traffic light detection); long range RADARs (e.g., for long range obstacle tracking and avoidance); GNSS/INS (e.g., for ultra-high precision localization); and/or any other suitable sensors.

In preferred variations, for instance, the sensor system is configured to enable a determination of a pose (and/or any other location and/or orientation parameter(s)) of the agent, which is used to select a context associated with that pose (e.g., in a 1:1 fashion, with multiple options for context, etc.) based on a labeled map. In specific examples, the sensor system includes a localization subsystem which determines the pose, wherein the localization subsystem includes any combination of GPS, IMU, LIDAR, camera, and/or other sensors mounted on the vehicle to estimate its current position at any given time. The sensor system further preferably enables the determination of information (e.g., location, motion, etc.) of objects and/or features in the environment of the agent, such as, but not limited to: dynamic objects, static objects, road infrastructure, environmental conditions (e.g., rain, snow, lighting conditions, etc.), and/or any other suitable information.

Additionally or alternatively, the sensor system can include any other suitable sensors configured to collect any suitable sensor information.

Further additionally or alternatively, the system 100 can include any other suitable components or combination of components.

4. Method 200

As shown in FIG. 2, the method 200 includes receiving a set of inputs S210 and determining a context associated with an autonomous agent based on the set of inputs S220. Additionally or alternatively, the method 200 can include any or all of: labeling a map S205; selecting a learning module (context-specific learning module) based on the context S230; defining an action space based on the learning module S240; selecting an action from the action space S250; planning a trajectory based on the action S260; and/or any other suitable processes.

The method preferably implements and/or interfaces with a system implementing hybrid decision making as described above, but can additionally or alternatively implement and/or interface with methods implementing any other suitable decision making.

The method 200 functions to determining a context associated with an autonomous agent and thereby enable context-aware decision making of the autonomous agent. Additionally or alternatively, the method 200 can function to enable selection of an action to be performed by the autonomous agent, the generation of a trajectory to be traveled by the autonomous agent, and/or perform any other suitable function(s).

The method 200 is preferably performed with a system 100 as described above, but can additionally or alternatively be performed with any suitable system.

The method 200 is preferably performed throughout the duration of the route being traveled by the autonomous agent and based on a map (e.g., continuously checking for a context change), but can additionally or alternatively be performed at any or all of: a predetermined frequency (e.g., constant frequency), in response to a trigger, at a set of intervals (e.g., random intervals), once, and/or at any other suitable times.

4.1 Method—Labeling a Map S205

The method 200 can optionally include labeling a map S205, which functions to specify the context for the vehicle at any location of the autonomous agent along a route (e.g., predetermined route). Additionally or alternatively, labeling the map can function to specify the location of one or more static objects along a route of the agent; a location and/or other information of lane boundaries and/or other road features (e.g., information about current lane, lane boundaries, lane lines, etc.); the locations of starting points and vehicle destinations; a set of parameters (e.g., speed limit, target vehicle speed, dimensions, etc.) associated with locations of the vehicle; and/or any other suitable information.

Figure 6:
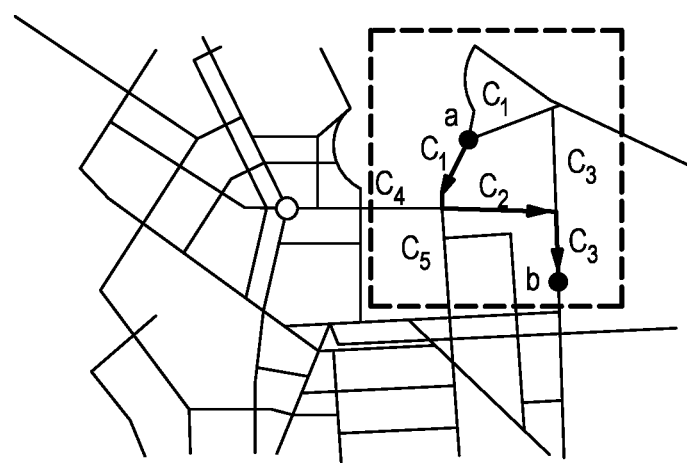
FIG. 6 depicts a schematic of a variation of context switching for fixed routes in comparison to the route options in a geo-fenced operational design domain (ODD).

The map is preferably a high definition map but can additionally or alternatively be or include any other suitable maps. The map is further preferably hand labeled with any or all of the information described above, which can be enabled, for instance, by the small ODD and fixed route approach to preferred variations of the system and method. This functions to produce a highly accurate, safe, and dependable map with which to transition between vehicle contexts. In variations of conventional systems and methods implementing geofenced ODDs (e.g., as shown in FIG. 6), for instance, the number of potential routes available to the vehicle is significant, thereby causing: more required switches between contexts (e.g., increasing the chance of incorrectly selecting a context); increased requirements for storing and switching between a large number of fully learned models (e.g., resulting in a computationally crippling problem); and/or any other effects.

The contexts are preferably assigned to one or more particular regions in the map (e.g., hard-coded into the map, soft-coded into the map, etc.), such that a particular context relevant to the agent (e.g., context in which agent is located, context in which the agent is about to be located, context that agent has departed, etc.) can be determined (e.g., with one or more inputs received in S210 such as pose information of the autonomous agent) in S220.

The contexts are preferably assigned to locations and/or regions within the map. Each location and/or region in the map can be assigned any or all of: a single context; multiple contexts (e.g., indicating an intersection of multiple routes, wherein a single context is selected based on additional information such as any or all of the inputs received in S21o, etc.); no context (e.g., indicating a location and/or region not on a fixed route option for the autonomous agent); and/or any combination of contexts. The particular context(s) assigned to the location and/or region are preferably determined based on the static environment at that location and/or within that region, such as any or all of: features of the roadway within that region (e.g., number of lanes, highway vs. residential road, one-way vs. two-way, dirt and/or gravel vs. asphalt, curvature, shoulder vs. no shoulder, etc.); landmarks and/or features within that region (e.g., parking lot, roundabout, etc.); a type of zone associated with that location and/or region (e.g., school zone, construction zone, hospital zone, residential zone, etc.); a type of dynamic objects encountered at the location and/or region (e.g., pedestrians, bicycles, vehicles, animals, etc.); traffic parameters associated with that location and/or region (e.g., speed limit, traffic sign types, height limits for semi trucks, etc.); and/or any other environmental information.

In a first set of variations, the map is a high-definition map with hardcoded contexts. In specific example, the map is a geo-location file with semantic annotations of context for variations points and/or areas.

Additionally or alternatively, the time of day at which a route is being taken and/or one or more dynamic (e.g., temporal) features can be taken into account, such as any or all of: traffic patterns (e.g., at the time that a fixed route is scheduled to and/or most likely to take place); weather conditions; lighting conditions; time-specific zone information (e.g., times at which school zone restrictions are enforced); and/or any other suitable information.

In some variations, dynamic objects (e.g., surrounding vehicles, pedestrians, animals, moving objects, etc.) and/or non-permanent objects or environments (e.g., construction sites) are preferably accounted for with a sensor system (rather than the map), wherein in an event that the context is not recognizable and/or otherwise affected based on the dynamic object (as calculated in an uncertainty estimate), a fallback motion planner can be triggered. Additionally or alternatively, maps can be dynamically and/or iteratively produced to account for any or all of the features and/or objects.

Additionally or alternatively, the context assignments can be determined based on route information (e.g., fixed route information), such as a set of fixed routes prescribed for the autonomous agent to take. The route information can include any or all of: a starting location of the route, a destination of the route, a directionality of the autonomous agent along the route, and/or any other information. In variations involving fixed routes, for instance, the contexts assigned to the map are preferably selected based on the vehicle's progression along the route and the contexts that the vehicle would sequentially encounter in doing so. In specific examples, for instance, an intersection at which the agent is planned to pass straight through in a first fixed route may be assigned a different context than the same intersection at which the agent is planned to turn right at in a second fixed route.

Additionally or alternatively, any or all of the contexts can be determined independently of a route and/or a fixed route.

Figure 13:
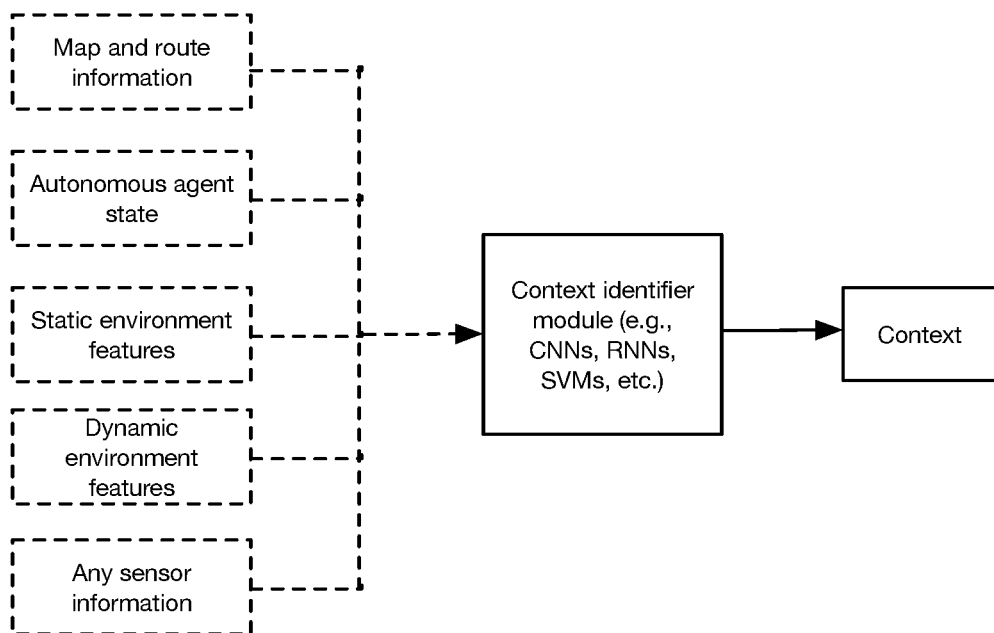
FIG. 13 depicts a variation of a context identifier module which determines a context for the vehicle based on a set of inputs and one or more models and/or algorithms.

Additionally or alternatively, one or more contexts identified in S220 can be determined based on a map without assigned and/or prescribed contexts, such as in variations in which the context is identified with one or more programmed processes and/or machine learning processes (e.g., as described in S22o) based on a set of inputs (e.g., those described in S210). In some variations, for instance, a context is identified with a context identifier module (e.g., as part of the agent's planning module, as part of the computing system, etc.), such as that shown in FIG. 13, wherein the context identifier module can receive inputs from the map such as road infrastructure information (e.g., location of, size of, parameters associated with, etc.) and/or static environment features, which can individually and/or collectively include, but is not limited to, any or all of: road signs, lane lines, buildings, railroad tracks, bus routes, and/or other infrastructure information.

The map can optionally include (e.g., assign, prescribe, etc.) one or more transition zones which are arranged between different contexts, and can indicate, for instance, a change in context (e.g., along a fixed route, along a dynamically determined route, etc.), thereby enabling a switching of contexts to occur smoothly (e.g., by defining an action space). Assigning transition zones can function, for instance, to define an action space subsequently in the method which smoothly transitions the vehicle from one context to the next (e.g., preventing the availability of certain actions, prescribing that the agent maintain his or her lane, preventing a turn, etc.). The transition zones can be any or all of: overlapping with (e.g., partially overlapping with, fully overlapping with, etc.) one or more contexts; non-overlapping with one or more contexts; and/or any combination of overlapping and non-overlapping. Additionally or alternatively, the transition zones can be contexts themselves; the method can be performed in absence of labeled transition zones (e.g., by anticipating the subsequent context); and/or be otherwise performed.

In a first variation, S205 includes hand labeling a high definition map to prescribe a set of contexts, further preferably a series of contexts, for at least a set of fixed routes available to an autonomous agent. S205 further preferably includes hand labeling a set of static objects and/or road features associated with the routes. In specific examples, each region in the map is assigned a single context (e.g., for all routes, for a specific route, etc.). Additionally or alternatively, each region in the map can be assigned multiple contexts (e.g., for overlapping routes, to be selected from, etc.).

In a second variation, S205 includes labeling a map without prescribed contexts, wherein the context is determined subsequently in the method 200 (e.g., with one or more machine learning models). In specific examples, the map is labeled with road features and/or landmarks, which are subsequently used (e.g., with sensor information) to determine a context.

Additionally or alternatively, S205 can be performed in another suitable way or the method 200 can be performed in absence of S205.

4.2 Method—Receiving a Set of Inputs S210

The method 200 includes receiving a set of inputs S210, which functions to receive information with which to determine a context for the autonomous agent. Additionally or alternatively, S210 can function to receive information with which to perform any suitable processes of the method (e.g., determine an action and/or behavior, determine a trajectory of the agent, etc.). Additionally or alternatively, S210 can include determining (e.g., calculating) any or all of the set of inputs, combining inputs (e.g., in one or more sensor fusion processes), processing and/or preprocessing the set of inputs, and/or any other suitable processes.

S210 is preferably performed throughout the method 200, such as any or all of: continuously, at a predetermined frequency, at random intervals, prior to each of a set of processes of the method 200, and/or at any other suitable times. S210 can additionally or alternatively be performed in response to a trigger (e.g., based on the map, based on sensor information, etc.), at random intervals, and/or at any other suitable time(s) during the method 200.

The set of inputs received in S210 preferably includes sensor information collected at a sensor subsystem of the autonomous agent, such as any or all of: a sensor system onboard the autonomous agent, a sensor system remote from the autonomous agent, and/or a sensor system in communication with the autonomous agent and/or a computing system (e.g., onboard computing system, remote computing system, etc.) of the autonomous agent. Additionally or alternatively, the sensor information can be collected from any other suitable sensor(s) and/or combination of sensors, S210 can be performed in absence of collecting sensor inputs, and/or S210 can be performed in any other suitable way(s).

The sensor information preferably includes location information associated with the autonomous agent, such as any or all of: position, orientation (e.g., heading angle), pose, geographical location (e.g., using global positioning system [GPS] coordinates, using other coordinates, etc.), location within a map, and/or any other suitable location information. In preferred variations, for instance, S210 includes receiving pose information from a localization module of the sensor subsystem, wherein the localization module includes any or all of: GPS sensors, IMUs, LIDAR sensors, cameras, and/or any other sensors (e.g., as described above). Additionally or alternatively, any other sensor information can be received from any suitable sensors.

The sensor information can additionally or alternatively include motion information and/or other dynamic information associated with the autonomous agent, such as, but not limited to, any or all of: velocity/speed, acceleration, and/or any other suitable information.

The sensor information further preferably includes location information and/or motion information associated with one or more dynamic objects in an environment of the autonomous agent, such as any or all of the location information described above, location information relative to the autonomous agent, motion information of the dynamic objects, predicted information (e.g., predicted trajectory), historical information (e.g., historical trajectory), and/or any other suitable information. The dynamic objects can include, but are not limited to, any or all of: other vehicles (e.g., autonomous vehicles, non-autonomous vehicles, 4-wheeled vehicles, 2-wheeled vehicles such as bicycles, etc.), pedestrians (e.g., walking, running, rollerblading, skateboarding, etc.), animals, and/or any other moving objects (e.g., ball rolling across street, rolling shopping cart, etc.). Additionally or alternatively, the sensor information can include any other information associated with one or more dynamic objects, such as the size of the dynamic objects, an identification of the type of object, other suitable information, and/or the information collected in S210 can be collected in absence of dynamic object information.

The sensor information can optionally include location information and/or other information associated with one or more static objects (e.g., stationary pedestrians, road infrastructure, construction site and/or construction equipment, barricade(s), traffic cone(s), parked vehicles, etc.) in an environment of the autonomous agent, such as any or all of the information described above (e.g., identification of object type, etc.). Additionally or alternatively, the sensor information can include any other information associated with one or more static objects and/or the information collected in S210 can be collected in absence of static object information.

The set of inputs received in S210 further preferably includes the map and/or any information determined from (e.g., determined based on, derived from, included in, etc.) the map, such as any or all of the information described above in S205. In some variations, this includes one or more contexts (and/or transition zones) selected based on (e.g., predetermined/assigned to) a region/location of the autonomous agent (e.g., as determined based on sensor information as described above). In additional or alternative variations, the map information includes any or all of: road infrastructure information and/or other static environment information, route information, and/or any other suitable information.

Information associated with the map can optionally be determined based on other information received in S210, such as any or all of the sensor information received at one or more sensor systems. For instance, location information (e.g., current pose, current position, current geographical location, etc.) associated with the autonomous agent can be used to locate the agent within the map (e.g., determine its position within a hand labeled map), which is used to determine the map information relevant to the autonomous agent. In a first set of variations, this information is a particular context selected (e.g., assigned to) based on the location of (e.g., a region including the location, a stretch of road on which the agent is located, a particular intersection in which the agent is located, etc.) the autonomous agent. In a second set of variations, the location of the autonomous agent in comparison with the map includes information associated with the road infrastructure (e.g., road signs, lane lines, buildings, etc.), which is used, preferably along with other inputs (e.g., static environment features, static object information, autonomous agent vehicle state, dynamic environment features, etc.) to determine a context (e.g., using one or more learning-based models, using a pattern recognition and/or classification model, etc.) for the autonomous agent.

Additionally or alternatively, the map information can include any other information (e.g., a set of possible contexts, a set of parameters and/or weights for an algorithm and/or model, etc.) and/or be received in any other way, such as, but not limited to, any or all of: independently of other information received in S210, concurrently with other information received in S210, prior to other information received in S210, subsequent to other information received in S210, multiple times in S21o, and/or at any other suitable time(s).

The set of inputs can optionally include a route and/or associated route information (e.g., route identifier of a fixed route, agent's progression through route, etc.) assigned to and/or being traversed by the agent (e.g., fixed route selected for the agent, dynamic route being traveled by the agent, predicted route for the agent, etc.), which can function for instance, to select information from one or more maps and/or to select a particular map (e.g., a route-specific map). The map information selected based on route can include, but is not limited to, any or all of: a current context, a future context (e.g., next context in a fixed route), a transition zone, and/or any other suitable information from a map. In variations in which a context is selected based on a map, route information can be used to select the appropriate context for the particular route in regions in which multiple routes are overlapping (e.g., at an intersection which multiple routes pass through). The route information (e.g., previous contexts of route, historical information, fixed route identifier, destination, starting point, directionality of route, etc.) can be used, for instance, to select the proper context from multiple context options. Additionally or alternatively, the route information can be used in other processes of the method 200 (e.g., in defining an action space based on the context, in selecting a behavior from the action space, in determining the agent's trajectory, etc.), any other suitable information can be determined based on route information, the set of inputs can be collected independently of and/or in absence of route information, and/or S210 can be performed in any other suitable ways.

The set of inputs S210 can additionally or alternatively include any other suitable information, such as, but not limited to, any or all of: a state (e.g., operational state, driving state, etc.) of the autonomous agent, a trajectory of the agent, a set of control commands for the agent, historical information associated with the agent and/or an environment of the agent, predicted information associated with the agent and/or the environment (e.g., predicted trajectories of dynamic objects), and/or any other suitable information and/or inputs.

Figure 12:
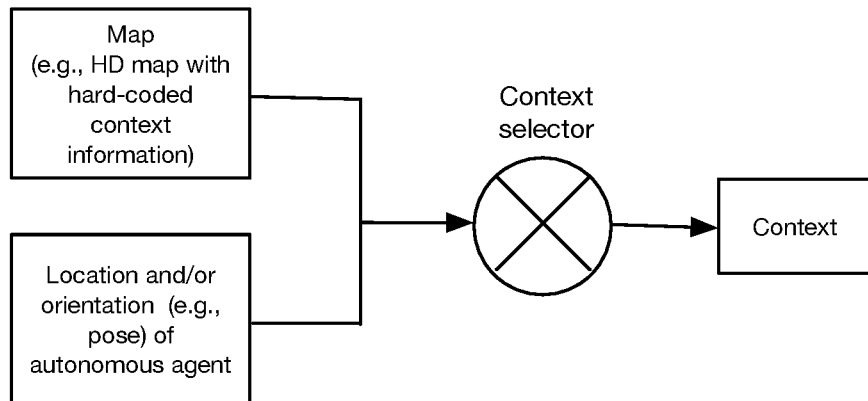
FIG. 12 depicts a variation of a context selector in which a context is selected based on a map and a location and/or orientation of the vehicle.

In a first set of variations (e.g., as shown in FIG. 12), S210 includes receiving a map specifying a set of assigned contexts for an agent; optionally a route (e.g., fixed route) of the agent; and sensor information from a set of sensors onboard the autonomous agent, wherein the sensor information includes at least a pose of the autonomous agent, wherein the pose and optionally the route are used to select a context for the agent based on the map. Additionally or alternatively, S210 can include receiving any other suitable inputs.

In a set of specific examples, S210 includes receiving a selected route for the vehicle, a high definition hand-labeled map specifying a context for each portion of the route (and optionally other routes), and sensor information including at least location information associated with the vehicle and optionally any or all of: motion information, object information (e.g., dynamic object information, static object information, etc.), and/or any other suitable information.

In a second set of variations, S210 includes receiving a map including information associated with road infrastructure, such as the road infrastructure along one or more routes of the agent (e.g., a fixed route of the agent) and optionally any or all of: other map information (e.g., speed limit information, traffic laws, etc.); a state of the agent, equivalently referred to herein as an ego state (e.g., as determined by a sensor subsystem; pose, velocity, and acceleration; etc.); static environment features and/or information; dynamic environment features and/or information; sensor information; and/or any other suitable information, wherein the context is determined with one or more models and/or algorithms (e.g., convolutional neural networks [CNNs], recurrent neural networks [RNNs], support-vector machines [SVMs], etc.).

In a set of specific examples, a context identifier module, which includes one or more deep learning models, receives as input a map and optionally route information for the agent, a state of the agent, static environment features, and dynamic environment features, with which the context identifier module determines a context for the agent.

In a third set of variations, S210 includes receiving a set of multiple possible contexts for the agent based on a map, wherein a context of the set of multiple contexts is determined based on other inputs received in S210.

Additionally or alternatively, S210 can include any other suitable processes.

4.3 Method—Determining a Context Associated with the Autonomous Agent Based on the Set of Inputs S220

The method 200 includes determining a context associated with the autonomous agent S220, which functions to specify the context in which the autonomous agent is operating, and can further function to: select a learning module based on the context (e.g., according to a 1:1 mapping), define and/or a limit a set of behaviors or actions available to the agent, specify particular parameters (e.g., creep distance) associated with the behaviors and/or actions, reduce and/or minimize the amount of data required to training the learning modules, and/or perform any other suitable function(s).

S220 is preferably performed in response to (e.g., after, based on, etc.) S210, but can additionally or alternatively be performed as part of S210 and/or concurrently with S210, in place of S210, in absence of S210, multiple times throughout the method, and/or at any other time(s) during the method 200. Further additionally or alternatively, the method 200 can be performed in absence of S220.

A context refers to a high level driving environment of the agent, which can inform and restrict the vehicle's decision at any given time and/or range of times. The context can include and/or define and/or be determined based on any or all of: a region type of the vehicle (e.g., residential, non-residential, highway, school, commercial, parking lot, etc.); a lane feature and/or other infrastructure feature of the road the vehicle is traversing (e.g., number of lanes, one-way road, two-way road, intersection, two-way stop and/or intersection, three-way stop and/or intersection, four-way stop and/or intersection, lanes in a roundabout, etc.); a proximity to one or more static objects and/or environmental features (e.g., particular building, body of water, railroad track, parking lot, shoulder, region in which the agent can pull over/pull off to the side of a road, etc.); a proximity a parameter associated with the location (e.g., speed limit, speed limit above a predetermined threshold, speed limit below a predetermined threshold, etc.); road markings (e.g., yellow lane, white lane, dotted lane line, solid lane line, etc.); and/or any other suitable information.

Figure 4:
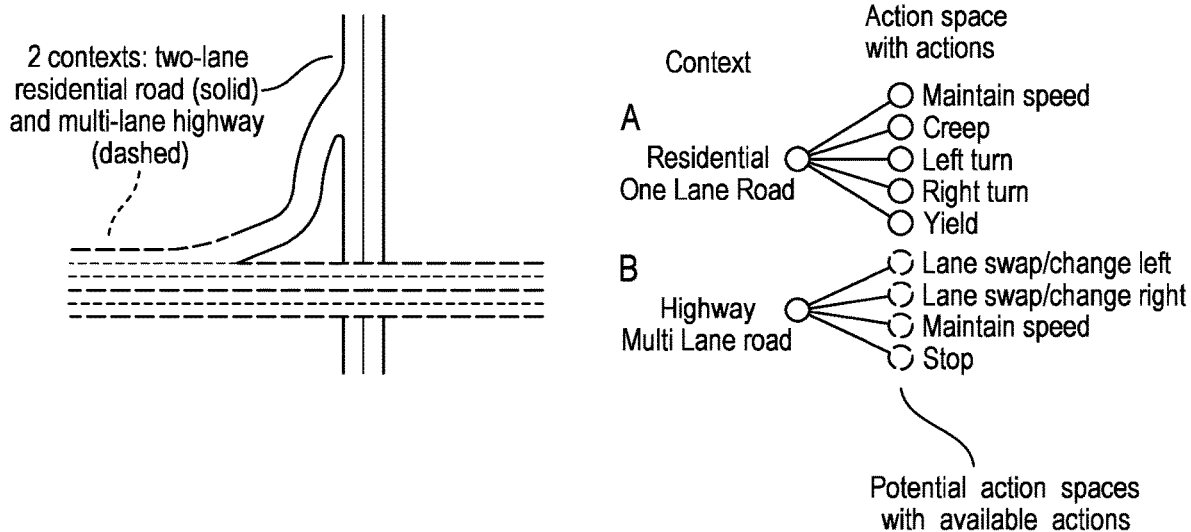
FIG. 4 depicts a variation of a set of contexts.

Examples of contexts can include, but are not limited to, any or all of: a two-way, two-lane residential road (e.g., in which the agent cannot change contexts due to road geometry as shown in FIG. 4); a two-way, two-lane non-residential road; a multi-lane highway (e.g., in which the agent can learn it is less likely to see pedestrians); a one-way, single-lane road; a one-way, two-lane road; a one-way road with "n" number (e.g., 1, 2, 3, 4, 5, 6, greater than 6, etc.) of lanes; a two-way road with "n" number (e.g., 1, 2, 3, 4, 5, 6, greater than 6, etc.) of lanes; a single lane road in a parking lot; a single lane road with a yellow boundary on the side; a multi-lane fast moving road (e.g., having a speed above a predetermined threshold); an on ramp of a highway; an off-ramp of a highway; regions connecting to roads (e.g., parking lot, driveway, etc.); and/or any other suitable contexts.

S220 is preferably performed based on a set of inputs received in S210, but can additionally or alternatively be performed based on any other suitable information.

S220 is preferably performed by reading a map (e.g., as described above) to determine the context assigned to a point and/or area corresponding to the location of the agent (e.g., pose) and/or a route of the agent. As described previously, each point and/or region can be any or all of: associated with at most 1 context (in a 1:1 mapping), associated with at most 1 context per route (e.g., wherein a fixed route assignment of the agent is used to select the proper context), associated with multiple contexts (e.g., which are ranked, prioritized, selected from based on other inputs received in S210), and/or otherwise associated. In specific examples, the context assignments are hard-coded into the map. Alternatively, the context assignments can be soft-coded and/or otherwise assigned.

Additionally or alternatively, S220 can be performed with any number of algorithms, models (e.g., machine learning models, deep learning models, supervised learning models, unsupervised learning models, semi-supervised learning models, statistical models, pattern recognition models, etc.), finite state machines (FSMs), processes (e.g., traditionally programmed process), decision trees, and/or equations.

In some variations, for instance, one or more machine learning models, such as, but not limited to: one or more neural networks (e.g., CNNs, RNNs, etc.); SVMs; and/or any other suitable models, are implemented to determine a context (e.g., as a context identifier module of FIG. 13) of the agent based on any or all of the inputs in S210.

Determining a context can optionally include switching between contexts, which preferably includes determining a transition between a current context and a future context. The transition can be in the form of any or all of: a transition zone (e.g., as described above) prescribed in the map; a change in contexts; a transition action/behavior (e.g., lane changing, merging, exiting a highway, etc.); a transition trajectory (e.g., trajectory taken by the vehicle to change from a $1^{st}$ lane into a $2^{nd}$ lane, etc.); and/or any can prescribe any other motion for the vehicle. The transition is preferably determined (e.g., prescribed) based on the map (e.g., as indicated as a transition zone, as indicated through distinct adjacent contexts in the map, as indicated through distinct sequential contexts in a fixed route, etc.), but can additionally or alternatively be dynamically determined, determined with a trajectory planner, determined based on sensor information, and/or otherwise determined.

S220 can optionally include selecting a scenario based on the context, which functions to further specify the context, such as based on any or all of the information described above (e.g., speed limit, sensor information of objects surrounding vehicle, etc.). Examples of scenarios for a first context (e.g., a two-way residential road) include, but are not limited to, any or all of: a right turn opportunity; an addition of a right turn lane; a stop sign; a traffic light; a yield sign; a crosswalk; a speed bump; and/or any other scenarios. Examples of scenarios for a second context (e.g., a multi-lane highway) include, but are not limited to, any or all of: lane changing; merging; overtaking a slow moving vehicle; and/or any other scenarios. In some variations, for instance, the context triggers the selection of a model and/or algorithm (e.g., a highly-tuned, context-aware custom inverse reinforcement learning (IRL) algorithm), which makes high-level scenario selection and calls a scenario-specific learning module (e.g., as described below) to select an action of the vehicle. Additionally or alternatively, any other suitable algorithms or processes for selecting a scenario can be implemented, an action can be selected in absence of a scenario, a context can be used to select another parameter, and/or S220 can be otherwise performed.

In a first set of variations, S220 includes selecting a context based on a location and/or orientation of the vehicle (e.g., pose), a labeled map, and optionally any or all of the other information received in S210, wherein the context informs how the remaining processes of the method are performed. Optionally, the context then triggers the selection of a particular scenario (e.g., based on a context-specific IRL algorithm).

Figure 14:
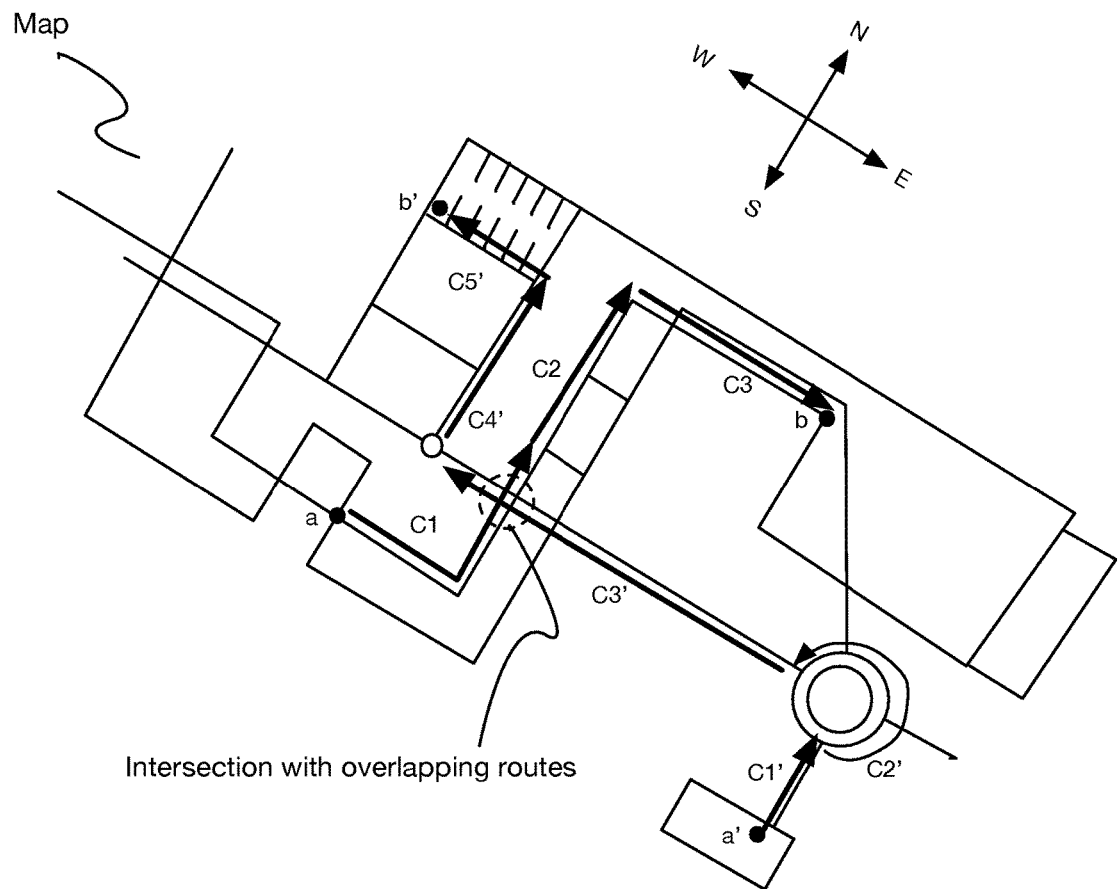
FIG. 14 depicts a variation of a map indicating a sequential series of contexts for each of a set of example routes.

In a set of specific examples (e.g., as shown in FIG. 14), a labeled map indicates a sequential series of contexts for each of set of routes (e.g., C1 to C2 to C3 for Route 1; C1' to C2' to C3' to C4' to C5' for Route 2; etc.), wherein in an event that the routes overlap in a particular section and/or point (e.g., intersection), a route assignment (e.g., Route 1 vs. Route 2) and/or directionality of the agent (e.g., West vs. East) can be used to select the proper context. The map can optionally further include transition zones (e.g., having a non-zero size, having a size of zero and indicating an immediate transition, etc.) between adjacent regions of different context(s) and/or any other information.

Figure 15:
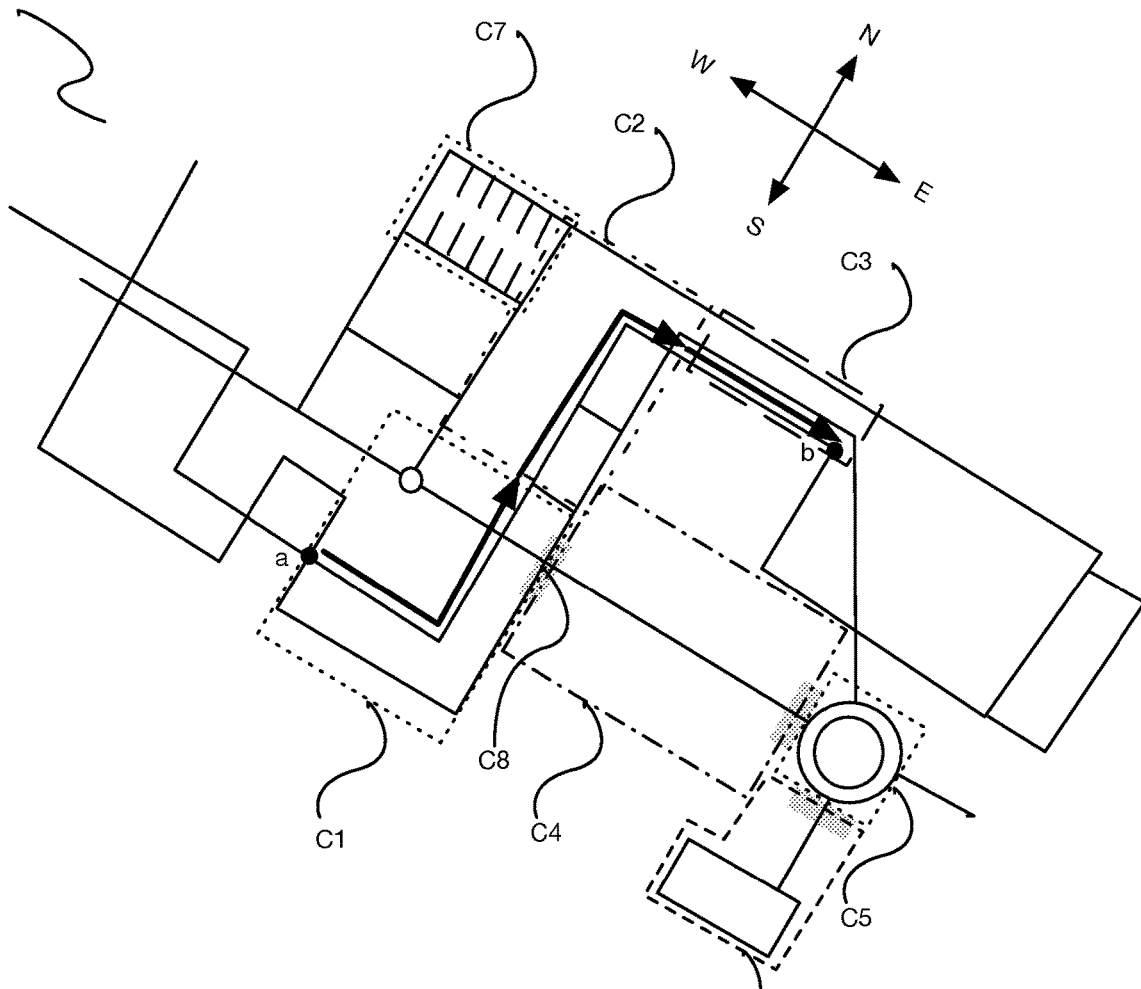
FIG. 15 depicts a variation of map indicating an example set of context region assignments.

In an additional or alternative set of specific examples (e.g., as shown in FIG. 15), a labeled map assigns a context to each of a set of regions of a labeled map, wherein a location of the agent within the region (and optionally a route assignment and/or directionality of the agent) determines the context for the agent. The map can optionally further include transition zones (e.g., having a non-zero size, having a size of zero and indicating an immediate transition, etc.) between adjacent regions of different context(s) and/or any other information.

In a second set of variations, S220 includes identifying a context associated with the agent with a context identifier module, the context identifier module including one or more trained models (e.g., machine learning model(s), deep learning model(s), etc.), which receives as input any or all of the information received in S210.

Additionally or alternatively, S220 can include any other suitable processes and/or be performed in any other suitable ways.

4.4 Method—Selecting a Learning Module Based on the Context and/or Scenario S230

The method 200 can include selecting a learning module based on the context and/or scenario S230, which functions to enable an action (equivalently referred to as a behavior) to be determined for the agent which takes into account the particular context (and optionally scenario) of the vehicle. S230 can additionally or alternatively function to define an action space available to the agent, inform a trajectory of the agent as determined by a trajectory planner, eliminate one or more actions from consideration by the agent (e.g., minimize a number of available actions to an agent), and/or can perform any other suitable functions.

S230 is preferably performed in response to (e.g., after, based on, etc.) S220, but can additionally or alternatively be performed as part of S220 and/or concurrently with S220, in place of S220, in absence of S220, in response to S210, multiple times throughout the method, and/or at any other time(s) during the method 200. Further additionally or alternatively, the method 200 can be performed in absence of S230.

S230 preferably includes selecting a learning module (equivalently referred to herein as a context-aware learning agent or a deep decision network) which includes a set of machine learning (e.g., deep learning) models and/or algorithms, wherein the learning module is trained based on data associated with that particular context. This functions to divide a large amount of data from all possible contexts into a set of manageable amounts, which cover all or nearly all of the situations the agent would encounter in that context.

Each context is preferably mapped in a 1:1 fashion to a learning module. Additionally or alternatively, a context can be associated with multiple learning modules (e.g., where results from multiple modules are aggregated, where a single learning module is then selected, etc.); a learning module can be associated with multiple contexts; and/or the contexts and learning modules can be otherwise mapped.

S230 can optionally include receiving a set of inputs, which can include any or all of the set of inputs described above, a different and/or additional set of inputs, and/or any other suitable inputs. In a set of variations, for instance, S230 includes receiving any or all of: the inputs described above; the context and/or scenario of the agent; the set of vehicles and/or other dynamic objects surrounding the vehicle, the predicted paths (e.g., where will it be in lane and in which lane, etc.) of the dynamic objects, static objects surrounding the agent; uncertainty values (e.g., of the predicted paths); routing information associated with the agent; and/or any other suitable inputs.

Figure 16:
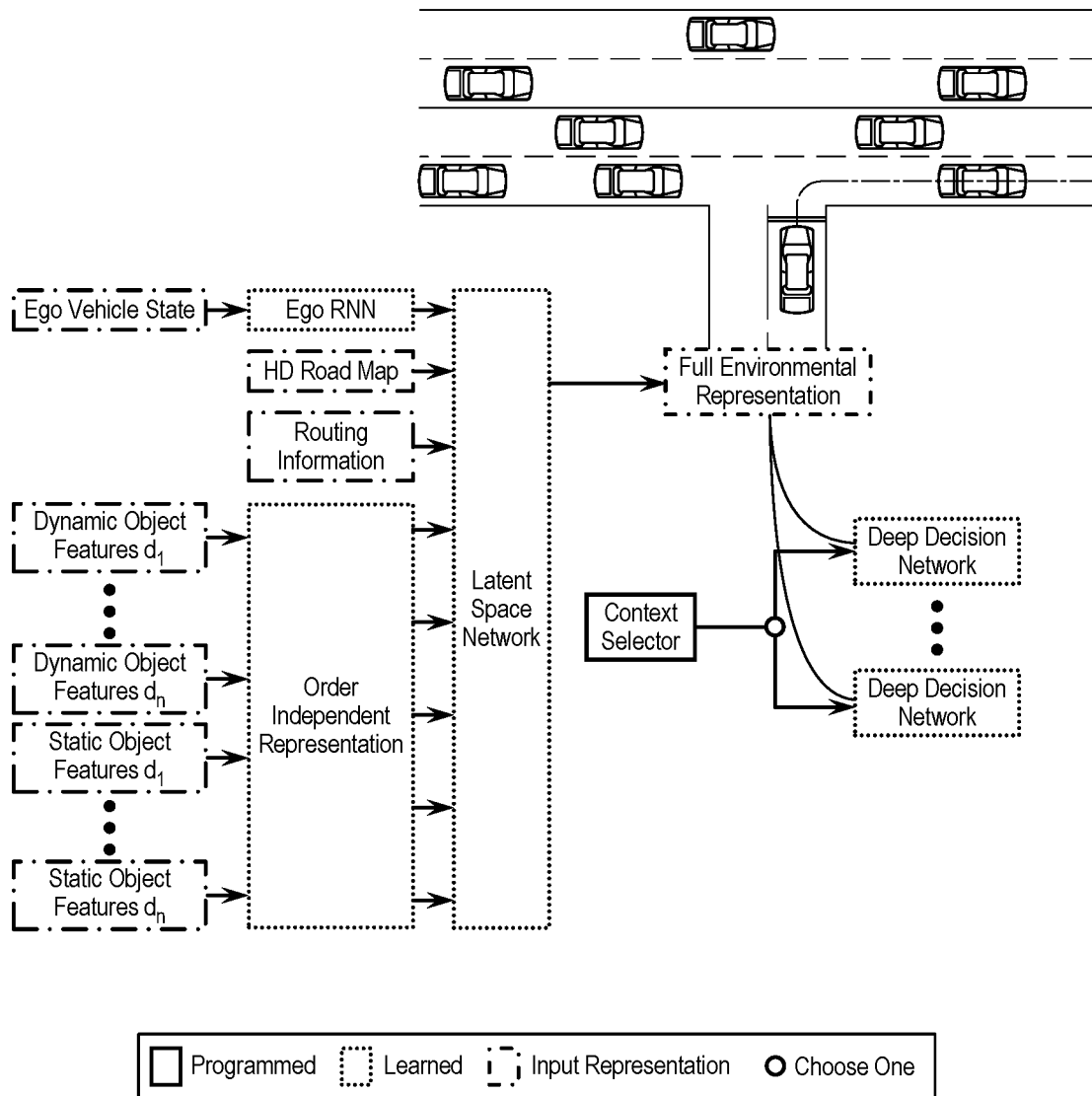
FIG. 16 depicts a variation of a context selector and set of learned deep decision networks.

In some variations (e.g., as shown in FIG. 16), an environmental representation of the agent is received with the context at a deep decision network selected based on the context. In an example of this shown in FIG. 16, the environmental representation (referred to as a full environmental representation) includes a latent space representation of a set of inputs (e.g., as described in S210, additional or alternative to those described in S210, etc.), the set of inputs including any or all of: a state of the agent (equivalently referred to herein as an ego vehicle state), one or more maps, routing information (e.g., a selected fixed route, parameters associated with a selected fixed route, etc.), dynamic object information/features, static object information/features, and/or any other suitable information. One or more models (e.g., machine learning models, deep learning models, RNNs, etc.) and/or processes and/or algorithms can optionally be used to process any or all of these inputs (e.g., to determine a latent space representation, to determine another output, to simplify the input(s) to the deep decision network, etc.). In specific examples (e.g., as shown in FIG. 16), for instance, a first neural network (e.g., one or more RNNs, one or more CNNs, a combination of RNNs and CNNs, Order Independent Representation in FIG. 16, etc.) is used process object features (e.g., dynamic, static, both, etc.) in the environment of the agent, which can function, for instance to produce an intermediate representation (e.g., abstraction) of object features. In specific examples, the first neural network is a CNN including a set of one or more convolution and/or pooling layers. Additionally or alternatively, any other suitable models can be used. This representation can optionally be combined with (e.g., appended with in a vector and/or matrix) other environmental information/inputs (e.g., route information, map, agent/ego pose, etc.) and/or outputs from other models, such as a second neural network (e.g., an RNN, a CNN, Ego RNN in FIG. 16, etc.) which processes the ego vehicle state. Any or all of this information can then be fed into a latent space network (e.g., RNN, CNN, etc.), which is used to determine the environmental representation based on the outputs of these other networks and optionally map information, routing information, and/or any other suitable inputs. The latent space network is preferably in the form of and/or includes one or more autoencoders (with one or more encoders, code, and decoders), but can additionally or alternatively include any or all of: other unsupervised learning models, supervised learning models, semi-supervised learning models, and/or any other suitable neural networks and/or models. In specific examples, the latent space network is a fully-connected feedforward neural network. The output of the latent space representation, which is preferably a low-dimensional features vector (but can additionally or alternatively be any other output) is preferably then used as an input to the learning module.

Additionally or alternatively, any other suitable models and/or algorithms can be implemented, the input and/or outputs can be different for these models and/or algorithms, and/or any suitable model architecture can be implemented.

The learning module is preferably in the form of a machine learning model, further preferably in the form of one or more neural networks and/or models (e.g., convolutional neural network [CNN], inverse reinforcement learning [IRL] model, reinforcement learning [RL] model, imitation learning [IL] model, etc.) trained for a particular context and/or contexts, but can additionally or alternatively include any other suitable models, algorithms, decision trees, lookup tables, and/or other tools.

In preferred variations, each of the learning modules is a neural network, further preferably a deep Q-learning network (e.g., IRL algorithm/network), wherein the number of layers (e.g., hidden layers) of the neural network can vary for different contexts and/or actions (e.g., between 3-8 layers, 3 or less layers, 8 or more layers, between 2 and 10 layers, between 1 and 15 layers, etc.). Additionally or alternatively, any other suitable networks, algorithms, and/or models can be used in the learning module(s), such as, but not limited to, any or all of: policy gradient methods, finite state machines [FSMs], probabilistic methods (e.g., Partially Observable Markov Decision Process [POMDP]), imitation learning [IL], RL or variations of IRL, and/or any other suitable models and/or networks and/or algorithms. Each of the learning modules is preferably the same type of neural network (e.g., with different numbers of layers) and/or algorithm and/or model, but can alternatively be different.

Each of the learning modules is preferably trained based on data occurring within the particular context type or context types associated with the learning module and optionally further trained based on data occurring within one or more fixed routes which pass through the context. In some variations, for instance, a single learning module applies to a particular context type, wherein the single learning module is trained based on different versions of that context. In other variations, a single learning module applies to a particular context within a particular route, wherein the single learning module is trained based on data associated with that particular context in the particular fixed route. Additionally or alternatively, the learning module(s) can be trained on any suitable data.

Each of the learning modules is further preferably trained with inverse reinforcement learning, which functions to determine a reward function and/or an optimal driving policy for each of the context-aware learning agents. The output of this training is further preferably a compact fully-connected network model that represents the reward function and an optimal policy for each learning module. Additionally or alternatively, the learning modules can be otherwise suitably trained and/or implemented.

In a first variation, S230 includes selecting a context-aware learning agent (equivalently referred to herein as a context-aware learning module) based on a determined context of the agent, wherein a single context-aware learning agent is assigned to each context. The context-aware learning agent is preferably trained with an inverse reinforcement learning technique, but can additionally or alternatively be otherwise trained.

In a second variation, S230 includes selecting from multiple context-aware learning agents assigned to and/or available to a particular context, wherein the particular context-aware learning agent is selected based on any or all of: machine learning, a decision tree, statistical methods, an algorithm, and/or with any other suitable tool(s).

Additionally or alternatively, any other suitable learning modules can be selected, used, and/or trained.

4.5 Method—Defining an Action Space Based on the Learning Module S240 and Selecting an Action from the Action Space S250

The method 200 can include defining an action space based on the learning module S240, which functions to define a set of actions (equivalently referred to herein as behaviors) available to the agent in light of the vehicle's context and/or environment. Additionally or alternatively, S240 can function to minimize a number of available actions to the agent as informed by the context, which functions to simplify the process (e.g., reduce the time, prevent selection of an incompatible action, etc.) required to select an action for the vehicle. The method 200 can optionally additionally or alternatively include selecting an action from the action space S250, which functions to determine a next behavior (e.g., switching and/or transitioning to a different behavior than current behavior, maintaining a current behavior, etc.) of the vehicle.

S240 and/or S250 are preferably performed in response to (e.g., after, based on, etc.) S230, but can additionally or alternatively be performed as part of S230 and/or concurrently with S230, in place of S230, in absence of S230, in response to S220 and/or S210, multiple times throughout the method, and/or at any other time(s) during the method 200. Further additionally or alternatively, the method 200 can be performed in absence of S240 and/or S250.

The action space and/or action is preferably produced as an output (e.g., intermediate output, final output, etc.) of the learning module; additionally or alternatively, the learning module can produce any other suitable outputs. In preferred variations, a determination of the context and processing based on this context (e.g., the specific learning module) allows the action space to be relatively small (e.g., relative to all available actions).

The actions can include, but are not limited to, any or all of: maintaining a lane, changing lanes, turning (e.g., turning right, turning left, performing a U-turn, etc.), merging, creeping, following a vehicle in front of the agent, parking in a lot, pulling over, nudging, passing a vehicle, and/or any other suitable actions such as usual driving actions for human-operated and/or autonomous vehicles.

Each action is preferably associated with a set of parameters, which are determined based on the particular context of the agent and optionally any other suitable inputs (e.g., sensor information). This highlights a benefit of this architecture, which enables various parameter values to be associated with an action, wherein the context specifies the particular value, thereby enabling the action learned for different contexts to be different yet predictable. In contrast, in conventional methods where the method is entirely programmed, for instance, one would need to either generalize the parameter (e.g., creep distance) to have an overly conservative value or program multiple values for different cases; and in methods including only learning based approaches, this would lead to an oversimplification of the action across cases, which could result in unpredictable agent behavior at times (e.g., robotic behavior, the production of an infeasible trajectory, etc.).

For preferred variations of this method, the extra information and restriction from the context type can reduce the amount of data that is needed to train the different learning approaches and better tune the agent to a specific context to increase accuracy and confidence.

In preferred variations, an output layer of each deep decision network is a softmax layer where the number of output nodes is the number of available actions. Additionally or alternatively, an action space and/or available actions can be determined in any other suitable way(s).

In a specific example, a multi-lane highway context produces a corresponding action space including: maintaining speed, lane change left, and lane change right. In contrast, a different context such as a residential road produces actions such as those in the highway context and additional actions such as stop, yield, creep, left turn, and right turn.

In additional or alternative variations, an output layer (e.g., linear output layer) can be used to generate an embedding (e.g., a vector, a vector of real numbers, etc.) for the action, wherein the embedding could be matched to stored embeddings associated with particular actions (e.g., at a lookup table). In specific examples, for instance, a length and/or angle of an embedding vector produced by an output layer can be used to match it to a vector associated with a particular action.

Selecting an action in S250 can be performed by the context-aware learning agent, performed with another model and/or algorithm and/or process, determined based on other information (e.g., any or all of the set of inputs from S21o), based on the particular route, based on a next context in the map, etc.), and/or otherwise determined.

In preferred variations, the action is produced as an output (e.g., single output, multiple outputs, etc.) of the context-aware learning agent.

In additional or alternative variations, the action can be determined based on a state machine or other rule-based method for choosing an action based on context.

Figure 5:
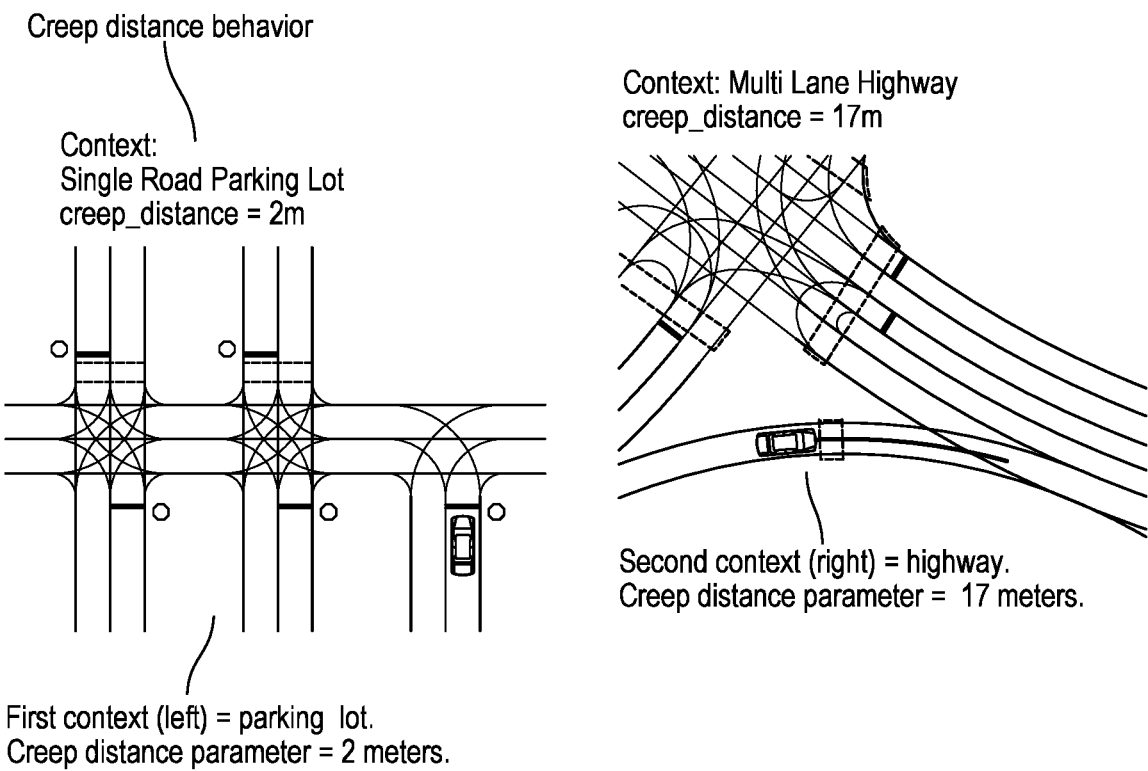
FIG. 5 depicts a variation of a vehicle executing a creep behavior within a particular context.

In a first variation, the context of the agent is determined from a map to be a one-lane residential road (e.g., in which the agent cannot change contexts due to road geometry as shown in FIG. 4). A set of actions determined for this context can include, for instance: maintaining speed, creeping, left turning, right turning, and yielding. For creeping (e.g., as shown in FIG. 5), a major parameter is creep distance, which refers to the distance the agent should creep forward with extra caution (e.g., before deciding to merge). For instance, humans tend to creep at a stop sign or before merging on a highway to cautiously gauge any oncoming traffic and pace the speed of the vehicle to merge without collisions or annoyance to road users. Depending on the particular context and optionally action, the value of this parameter is different. In specific examples (e.g., as shown in FIG. 5), for the context of a parking lot and the action of turning right and/or stopping at a stop sign, the creep distance is 2 meters, whereas for the context of a multi lane highway and the action of merging, the creep distance is 17 meters.

In a second variation, the context of the agent is determined to be a multi-lane highway in which the agent can learn (e.g., in the learning module) it is less likely to see pedestrians. The actions of the action space can include, for instance: lane swap left, lane swap right, maintain speed, and stop.

4.6 Method—Planning a Trajectory Based on the Action S260

The method 200 can include planning a trajectory based on the action S260, which functions to enable the agent to perform the selected action (e.g., as described above).

The trajectory preferably specifies the set of locations and associated speeds for the agent to be at in order to perform the selected action. The trajectory is preferably generated based on one of a set of trajectory learning modules (e.g., different than the learning module described above, separate from but including the same and/or a similar architecture as the learning modules described above, etc.), but can additionally or alternatively be generated with any other suitable tools, programmed or learned.

S260 can optionally additionally or alternatively include any or all of: validating the trajectory, implementing a fallback mechanism, operating the vehicle according to a trajectory, determining control commands with which to operate the vehicle based on a trajectory, and/or any other suitable output.

5. Variations

In a first variation of the method 200, the method includes: receiving a set of inputs S210, the set of inputs including at least map (e.g., high definition hand-labeled map, map labeled in an automated fashion, map labeled both manually and in an automated fashion, etc.), a vehicle location (e.g., pose), and optionally a route planned for the vehicle; determining a context prescribed by the map based on the location of the agent; selecting a learning module including a neural network based on the context; defining an action space including a set of actions available to the agent with the learning module; and selecting an action from the action space (e.g., with the learning module). Additionally or alternatively, the method 200 can include any other suitable processes (e.g., determining a trajectory based on the action).

In a specific example, the method 200 includes: receiving a set of inputs, wherein the set of inputs includes a hand labeled, high definition map prescribing a set of contexts, further preferably a series of contexts, for at least a fixed route of the autonomous agent, wherein the set of inputs further includes sensor information from a set of sensors onboard the autonomous agent, wherein the sensor information includes at least a pose of the autonomous agent, wherein the pose and optionally the route are used to select a context for the agent based on the map, and optionally any other suitable inputs; selecting a context based on a location and/or orientation of the vehicle (e.g., pose), the labeled map, and optionally any or all of the other information received, wherein the context informs how the remaining processes of the method are performed; selecting a context-aware learning agent based on the context, wherein a single context-aware learning agent is assigned to each context and trained (e.g., with an inverse reinforcement learning model); defining an action space and selecting an action based on the learning module; and determining a trajectory for the vehicle based on the action space and/or action.

Figure 7A:
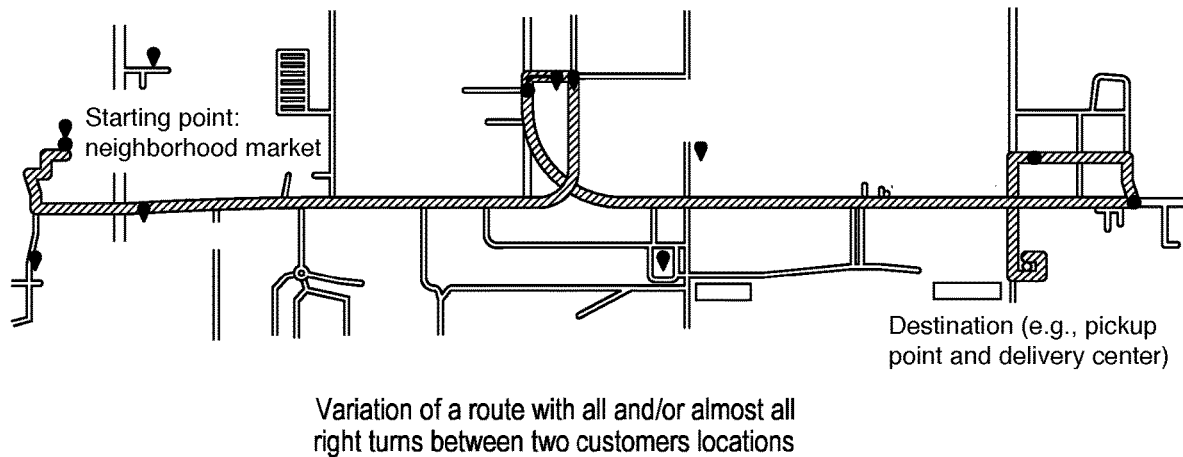
FIGS. 7A-7D depict an example of context selection along a route.
Figure 7B:
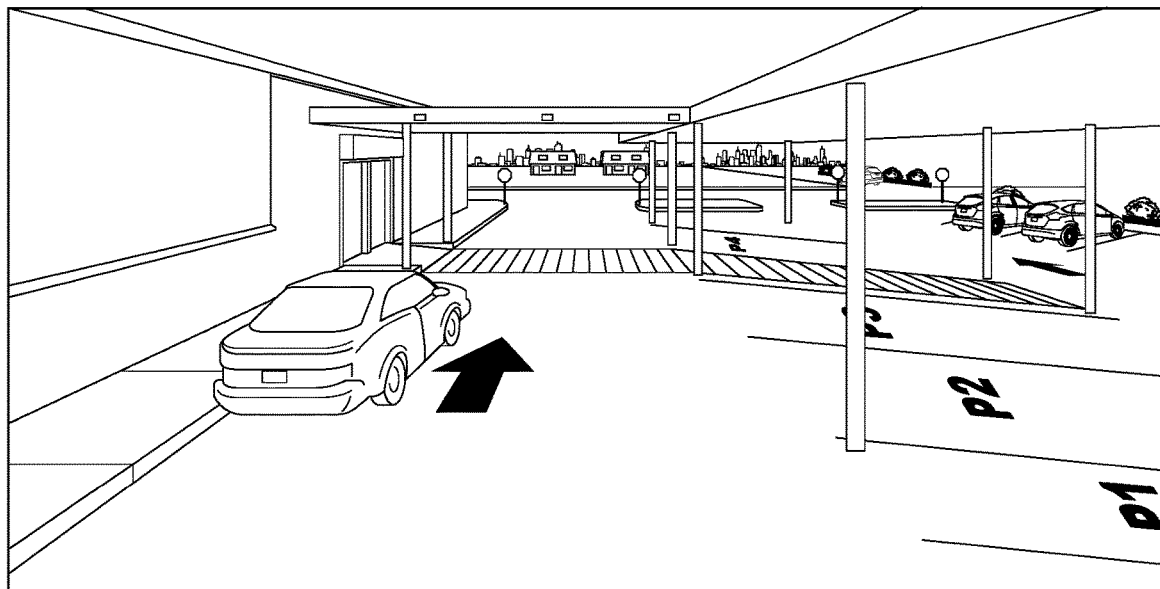
Figure 7C:
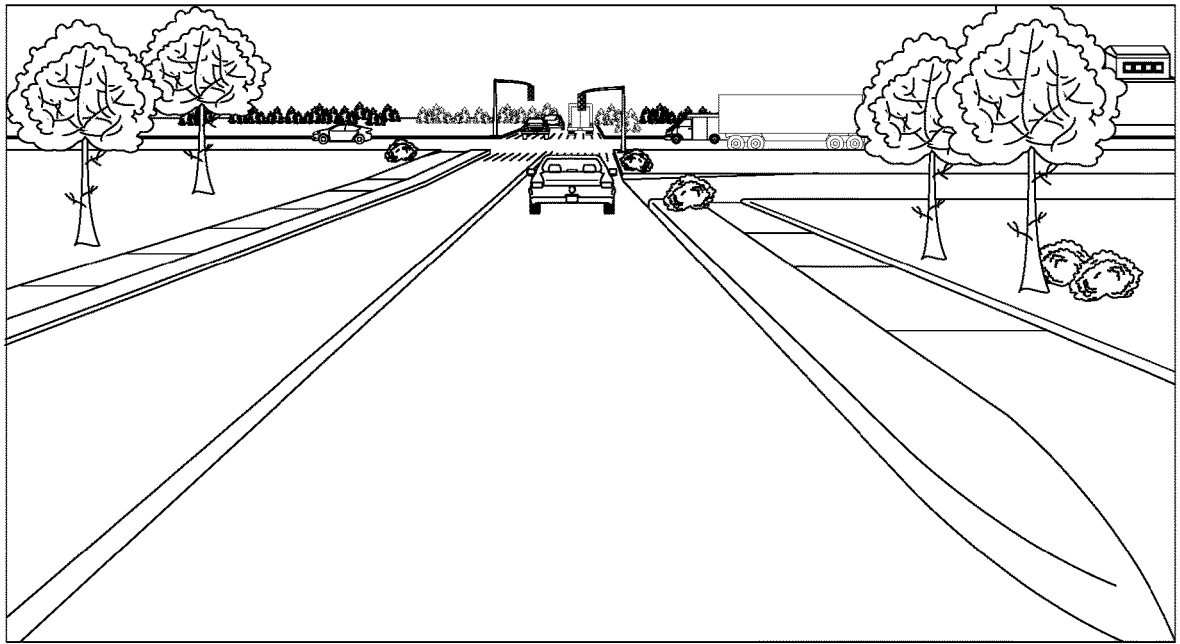
Figure 7D:
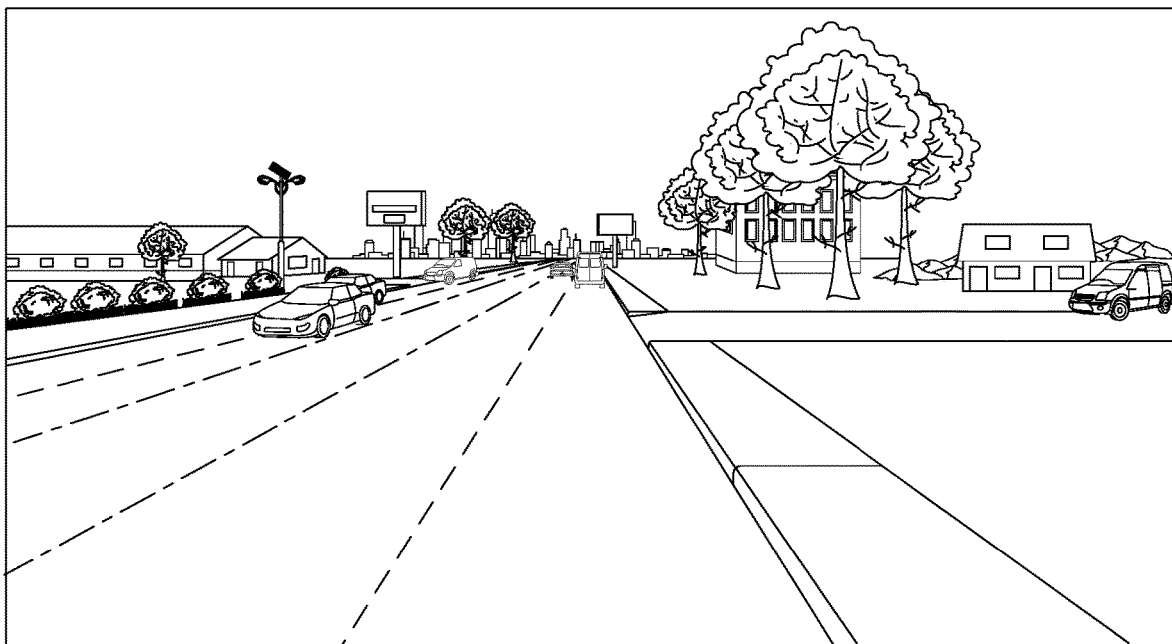

In a specific implementation as shown in FIGS. 7A-7D, the set of inputs includes receiving a route as shown in FIG. 7A; determining a first context shown in FIG. 7B based on the route and the map, wherein from the start of the trip, the vehicle is located in a parking lot type context with a single lane of traffic and expected heavy foot traffic. This foot traffic is usually localized to sidewalk however in this context pedestrian cutoff events are highly probable. To handle this context, the learning agent is optimized to be significantly more aware of pedestrians and their actions and as such the reward function is tuned to achieve this. The available actions to this agent are: maintaining a predetermined speed (e.g., speed bounded by any leading dynamic objects in agent's path and the speed limit of the current road); yielding behavior relative to a set of dynamic objects (e.g., which may have a precedence over the agent); staying stopped in the current location; and providing a stopping location which the ego vehicle must stop by. The second context that the vehicle encounters along this route, shown in FIG. 7C, is the context of a single lane residential road. This context is quite large including handling single lane traffic lights and stop sign intersection, pedestrian's crossing and right-hand turns. The decisions required to handle this context are very similar to that of the first context, the main difference being what the algorithm is trained on and that the reward function is tuned for two different sets of behaviors. The final context encountered by the agent, shown in FIG. 7D, is a multi-lane residential context, which includes everything that the single lane context needs to handle but in multiple lanes. Thus it needs to understand how to switch lanes, and how to handle turning on multi lane intersection. To handle this, in addition to the actions from the second context, it also contains the following two actions in its action space: changing to the left lane (when safe to do so) and changing to the right lane (when safe to do so).

In a second variation of the method 200, the method includes: receiving a set of inputs S210, the set of inputs including at least map (e.g., high definition hand-labeled map, map labeled in an automated fashion, map labeled both manually and in an automated fashion, etc.), a vehicle location (e.g., pose), and optionally a route planned for the vehicle; determining a context for the agent with a context identifier module based on the inputs; selecting a learning module including a neural network based on the context; defining an action space including a set of actions available to the agent with the learning module; and selecting an action from the action space (e.g., with the learning module). Additionally or alternatively, the method 200 can include any other suitable processes (e.g., determining a trajectory based on the action).

Additionally or alternatively, the method 200 can include any other suitable processes and/or be performed in any suitable way(s).

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for context-aware decision making of an autonomous agent, the method comprising:
   receiving a set of inputs;
   locating the autonomous agent within a map based on at least a portion of the set of inputs;
   determining a context associated with the autonomous agent based on the map and the set of inputs;
   selecting a first context-aware learned model from a set of context-aware learned models based on the context;
   operating the autonomous agent based on an output of the context-aware learned model;
   receiving a second set of inputs;
   detecting that the autonomous agent is transitioning to a second context based on the second set of inputs and the map; and
   and selecting a second context-aware learned model from the set of context-aware learned models based on the second context.

2. The method of claim 1, wherein the first context-aware learned model is selected based on a mapping from the context to the first context-aware learned model.

3. The method of claim 2, wherein the mapping maps the context to the first context-aware learned model in a 1:1 fashion.

4. The method of claim 1, wherein determining the action comprises selecting the action from an action space produced by the context-aware learned model.

5. The method of claim 1, wherein the set of inputs comprises:
   a set of poses of the autonomous agent;
   routing information associated with the autonomous agent, wherein the routing information is determined based on a set of fixed routes available to the autonomous agent;
   static object information; and
   dynamic object information.

6. The method of claim 1, wherein the set of inputs further comprises routing information associated with a fixed route of the autonomous agent.

7. The method of claim 6, wherein detecting that the autonomous agent is transitioning to the second context is further determined based on the routing information.

8. The method of claim 7, wherein the map comprises the routing information.

9. The method of claim 1, wherein the second context-aware learned is further selected based on a second mapping.

10. The method of claim 1, wherein each of the first and second contexts is selected from an ordered series of contexts, wherein the ordered series of contexts is associated with a fixed route of the autonomous agent.

11. The method of claim 1, wherein each of the set of context-aware learned models is trained based on data collected within an associated context.

12. The method of claim 1, wherein the map is hand labeled with the set of contexts.

13. The method of claim 1, wherein the map is dynamically labeled with the set of contexts.

14. A method for context-aware decision making of an autonomous agent, the method comprising:
   receiving a set of inputs, wherein the set of inputs is at least partially received from a sensor subsystem of the autonomous agent;
   locating the autonomous agent within a map based on the set of inputs;
   selecting a context associated with the autonomous agent based on the map and the set of inputs;
   selecting a context-aware learned model from a set of context-aware learned models based on the context;
   determining an action for based on the context-aware learned model;
   operating the autonomous agent based on the action.

15. The method of claim 14, wherein determining the action comprises defining an action space based on the context-aware learned model and selecting the action from the action space.

16. The method of claim 15, wherein the action space is associated with a set of parameters, wherein values of the set of parameters are determined based on the context.

17. The method of claim 16, wherein the set of parameters comprises a creep distance.

18. The method of claim 15, wherein the action space is at least partially determined based on a second context, wherein the second context occurs sequentially after the first context in the map.

19. The method of claim 14, wherein operating the autonomous agent based on the action comprises determining a trajectory for the autonomous agent based on the action.

20. The method of claim 19, wherein the trajectory is arranged along a fixed route associated with the autonomous agent.

* * * * *